(12) United States Patent
Sastry et al.

(10) Patent No.: US 8,435,580 B2
(45) Date of Patent: *May 7, 2013

(54) METHOD AND APPARATUS FOR PEELING PRODUCE IN BATCH OR CONTINUOUS FLOW

(75) Inventors: Sudhir Sastry, Dublin, OH (US); Pisit Wongsa-Ngasri, Bangkok (TH); Sarvesh N. Gupta, Milwaukee, WI (US); Brian F. Heskitt, Sunbury, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 1284 days.

This patent is subject to a terminal disclaimer.

(21) Appl. No.: 12/132,403

(22) Filed: Jun. 3, 2008

(65) Prior Publication Data

US 2008/0233250 A1    Sep. 25, 2008

Related U.S. Application Data

(63) Continuation-in-part of application No. 10/864,663, filed on Jun. 9, 2004, now Pat. No. 7,550,165.

(60) Provisional application No. 60/476,974, filed on Jun. 9, 2003.

(51) Int. Cl.
    *A23L 1/27*    (2006.01)
(52) U.S. Cl.
    USPC ............ 426/244; 426/479; 426/481; 426/482

(58) Field of Classification Search ................... 426/467, 426/479, 481–482, 237, 244; 99/358; 219/770–772
See application file for complete search history.

(56) References Cited

U.S. PATENT DOCUMENTS

| | | |
|---|---|---|
| 1,747,002 A | 2/1930 | Hamilton et al. |
| 1,992,398 A * | 2/1935 | Ryder .................. 426/482 |
| 2,730,149 A | 1/1956 | Aguilar et al. |
| 2,747,635 A | 5/1956 | Kofoid |
| 2,995,166 A | 8/1961 | Burley et al. |
| 3,077,217 A | 2/1963 | Hind |
| 3,339,603 A | 9/1967 | Dall-Argine et al. |
| 3,351,112 A | 11/1967 | Creed et al. |
| 4,099,454 A | 7/1978 | Theimer et al. |
| 4,739,140 A | 4/1988 | Reznik |
| 5,229,160 A | 7/1993 | Lang |
| 5,560,287 A | 10/1996 | Petelle et al. |
| 5,690,978 A | 11/1997 | Yin et al. |

(Continued)

FOREIGN PATENT DOCUMENTS

WO    2004110182 A2    12/2004

*Primary Examiner* — Steven Leff
(74) *Attorney, Agent, or Firm* — Standley Law Group LLP

(57) ABSTRACT

A continuous flow/batch peeling device and method of using the device comprising a tub comprising a treatment zone and holding a replaceable quantity of an electrically conductive fluid and at least one produce immersed in the fluid, a belt comprised of a nonconductive material and comprising at least one divider that exposes produce to the treatment zone, and at least one variable power supply connected to at least one set of electrodes that are fixed to a wall of the treatment zone and in electrical contact with the fluid such that when the electrodes are energized, an electrical current is produced in the fluid and the produce causing the peel to rupture from an outer layer of flesh of the produce.

17 Claims, 10 Drawing Sheets

U.S. PATENT DOCUMENTS

| | | |
|---|---|---|
| 6,305,271 B1 | 10/2001 | Overbeek |
| 6,522,834 B1 | 2/2003 | Herrick et al. |
| 6,537,600 B1 | 3/2003 | Meldrum |
| 6,787,105 B2 | 9/2004 | Robbins |
| 6,821,540 B2 | 11/2004 | Cousin et al. |
| 2003/0165608 A1 | 9/2003 | Cousin et al. |
| 2005/0019464 A1 | 1/2005 | Sastry et al. |

* cited by examiner

METHOD AND APPARATUS FOR PEELING PRODUCE IN BATCH OR CONTINUOUS FLOW

CROSS-REFERENCES TO RELATED APPLICATIONS

The present application is a Continuation in Part of and claims priority of U.S. Provisional Application No. 60/476,974 filed Jun. 9, 2003, PCT/US2004/018281 filed Jun. 6, 2004, and U.S. Ser. No. 10/864,663 filed Jun. 6, 2004, each of which are hereby incorporated by reference in its entirety.

FIELD OF THE INVENTION

The present invention relates to methods and devices for removing peel from produce, and more specifically to improved methods and devices for rapidly and efficiently peeling produce in bulk.

BACKGROUND OF THE INVENTION

It is common in many food processing applications to remove the outer skin of produce. Peeling of produce is performed for appearance, quality, or other purposes, such as to ensure uniform heating during additional processing operations. Where appearance and/or yield of a product is important, efficient peeling is fundamental to retain as much of the flesh of the produce as possible. Methods of peeling developed for commercial processing involve chemically or mechanically removing the skin from the flesh of the produce.

The tomato processing industry has developed a number of methods for peeling tomatoes where the processor desires that the end product remain firm and void of peel. Typical methods include lye peeling and steam peeling. Lye peeling typically involves submersing or spraying the tomato with a hot caustic solution, such as a 10-15% solution of sodium hydroxide (NaOH) or 7-18% solution of potassium hydroxide (KOH) (Concentrations may vary from 2M to 6M or 8% to 25% depending on commodity, cultivars, maturity, and other factors, such as temperatures used). Under these conditions, the peel of the tomato is softened and removed in a single thin layer with the flesh remaining mostly intact. This method normally results in maximum recovery of tomato flesh mass.

Lye peeling suffers from the disadvantage that a caustic material (NaOH or KOH) is used, resulting in operator hazards and the need to treat the effluent before discharge into the environment. A more preferred method currently used in the industry is to use a lye solution to treat the tomato peel, remove the peel and the peeled tomato from the solution, and then neutralize the solution with an acid, yielding salt and water. The neutralizing of the solution prior to disposal eliminates most of the adverse effect on the environment.

Steam peeling is also used commercially to remove the peel from a tomato. In steam peeling, tomatoes are exposed to steam to loosen the skin, which is then removed by mechanical means. Although more environmentally benign than lye peeling, tomato steam peeling does not yield as much flesh during peel removal as lye peeling, as the exposure of the tomato to high temperature steam causes some heating of the flesh of the tomato as well as the peel. Steam peeling frequently results in inferior peels, where some peel remains adhered to the skin, or the flesh is softened underneath, or both.

As existing methods for peeling produce, such as tomatoes and the like, have certain disadvantages, a need exists for a method of peeling produce to achieve optimum peel removal with minimum yield loss with by-products of the peeling process being environmentally compatible.

SUMMARY OF THE INVENTION

The present invention encompasses an apparatus and method for removing skins or peels from produce resulting in a whole peeled product. The apparatus and method of the present invention are useful in the peeling of a variety of produce, including but not limited to tomatoes.

The apparatus of the present invention comprises, briefly, a container or tub having a treatment zone and a variable power supply connected to the treatment zone by electrodes. The treatment zone contains an electrically conductive fluid and a produce having a peel that is immersed in the fluid. The produce is held immersed in the fluid via an upper barrier. In an embodiment, the electrodes are substantially the same height and width as the treatment zone containing the immersed produce. The distance between electrodes is determined by the produce to be peeled. When the power is energized, an electrical current is produced in the fluid and the produce. The current, after a sufficient time, ruptures the peel from an outer layer of flesh of the produce.

In an embodiment, the apparatus may further comprise 1) means to admit and discharge the fluid and the produce to and from the container; 2) a separator to separate the fluid from the peeled produce and ruptured peel; a transporter to transport the produce through or in and out of the container; and a motion producer to create motion in the fluid and the produce in the container.

The fluid may be water, a salt solution, an alkaline solution or a salt solution-alkaline solution mixture. The salt solution is preferably a sodium chloride (NaCl) or a potassium chloride (KCl) solution. The caustic solution is preferably a sodium hydroxide (NaOH) or a potassium hydroxide (KOH) solution. Mixtures are preferably an about 0.01 NaCl solution-an about 0.5 NaOH solution; an about 0.01 NaCl solution-an about 1.0 NaOH solution; an about 0.01 KCl solution-an about 0.5 NaOH solution; an about 0.01 KCl solution-an about 1.0 NaOH solution; an about 0.01 NaCl solution-an about 1.0 KOH solution; an about 0.01 NaCl solution-an about 0.5 NaOH solution; an about 0.01 KCl solution-an about 0.5 KOH solution; and an about 0.01 KCl solution-an about 1.0 KOH solution. The fluid may further comprise an additive.

The invention also comprises a method of removing a peel from produce having a peel comprising the steps of adding an electrically conductive fluid and produce to a container, subjecting the fluid and the produce to an electrical current for a time sufficient to remove the peel from the produce, and removing the produce from the container. The fluid may be at room temperature (about 20° C. to about 25° C.) prior to the application of the current, or may be heated or cooled.

In an embodiment, when the current is applied to the fluid and the produce, boiling fronts start at the blossom end and the stem end of the produce between the peel and the outer flesh and advance toward each other. Pressure caused by the boiling fronts rupture the peel, leaving a whole, peeled produce. The peel and the peeled produce are removed from the container and are ready for further processing.

Embodiments using 1) a mixture of an about 0.01 salt solution-an about 1.0 NaOH solution and a voltage of about 40V to about 90V, and more specifically about 40V to about 75V, and most specifically 75V; 2) a mixture of an about 0.01 salt solution-an about 0.5 NaOH solution and a voltage of about 75V to about 100V, and more specifically 75V; 3) a mixture of an about 0.01 salt solution-an about 0.5 KOH and a voltage of about 75V to about 125V; and 4) a mixture of an about 0.01 salt solution-an about 1.0 KOH solution and a voltage of about 50V to about 100V, more specifically, 50V to about 75V, provided satisfactory peel removal with low loss of produce weight (flesh).

An apparatus for removing a peel from a produce comprising a tub able to contain a replaceable quantity of an electrically conductive fluid and at least one produce and comprising a treatment zone. The treatment zone comprising an upper barrier to contain the produce within the fluid. The apparatus comprises a belt comprised of a nonconductive material. The belt transporting produce through the tub and the treatment zone. The belt comprising at least one divider. The apparatus comprises at least one variable power supply connected to at least one set of electrodes. The electrodes are fixed to a wall of the treatment zone and in electrical contact with the fluid such that when the electrodes are energized, an electrical current is produced in the fluid and the produce. The electrical current and the fluid act on the produce to rupture a peel of the produce from an outer layer of flesh of the produce. In an embodiment, a height of each electrode set is at least the height of the fluid in the treatment zone. Alternatively, the electrodes may be configured or positioned in any other way that accomplishes the peeling method according to the present invention; thus the present discussion is not intended to restrict the choice of electrode configurations that may be possible. Each electrode in a set are at a distance apart to permit passage of electrical current flowing between them through the fluid and the produce. At least one divider causes the electrical current to form a tortuous path through the fluid and the produce.

The belt comprises at least one non-conductive attachment that causes the electrical current to form a tortuous path through the fluid and the produce. The distance between an electrode set is proportional to the size of the treatment zone. The electrical voltage is regulated to be roughly in proportion to the distance between an electrode set and the voltage applied is regulated to achieve an optimal electric field strength within the treatment zone for peeling of the given produce. After peeling, the peeled produce is separated from the removed peel. In an embodiment, the separator is a jet of water sprayed onto the produce to effect the removal of the peel. The water with the peel is collected for optional further processing and the peeled produce is removed from the apparatus.

In an embodiment, the apparatus comprises a fluid temperature control device. In an embodiment, the apparatus comprises a storage unit, where the fluid is stored when it is not in the container or tub.

In an embodiment, the apparatus comprises non-electrical conducting watertight container capable of containing a fluid. The container comprising (a) a fluid inlet and a fluid outlet, (b) a treatment zone, and (c) at least one set of electrodes. The treatment zone comprises a non-electrically conductive upper barrier. The electrodes are located at a first and second wall of the treatment zone and extend from a floor of the treatment zone to at least the height of the upper barrier. Each electrode set is arranged at an interval along a length of the treatment zone and interconnected to an electrical power source. The fluid inlet and fluid outlet are connected to a storage container via tubing.

In an embodiment, the apparatus comprises a continuous loop belt connected to and powered by a belt power source. The belt comprises at least one divider. The belt and dividers are made of an electrically insulating material and capable of moving through the length of the treatment zone such that produce on the belt is (1) spaced apart by the dividers, (2) introduced to the treatment zone at a first end of the container, (3) conveyed through the treatment zone on the belt and (4) removed from the treatment zone and the container at an opposite end.

In an embodiment, the apparatus comprises a fluid pump. The fluid pump circulates fluid to the container from a storage container.

A method for removing a peel from a produce comprising the steps of:

(1) continuously adding and removing (or alternatively adding in a batch and removing as a batch) to a container (a) an electrically conductive fluid via an inlet/outlet and (b) at least one produce via a non-conductive belt, the belt comprising non-conductive dividers;

(2) subjecting the fluid and the produce to an electric current, the current flowing in a tortuous path around the non-conductive dividers, the belt adding and removing the produce to the fluid and the current for a time sufficient to remove a peel from the produce and preserve a raw peeled produce.

In an embodiment, the peeling occurs from at least one of a thermal, electrical, chemical and mechanical force. In an embodiment, the produce is a tomato and the fluid comprises an approximately 0.01% sodium chloride, 1.0% sodium hydroxide at an electric field strength of approximately 1210 Volts/meter. In an embodiment, the produce is a pear and the fluid comprises an approximately 2% sodium hydroxide at an electric field strength of approximately 532 Volts/meter. In an embodiment, the fluid comprises an approximately 3% sodium hydroxide at an electric field strength from about 426 to about 479 Volts/meter. In an embodiment, a temperature of the fluid is from about 20° C. to about 75° C. prior to application of the current.

In an embodiment, the treatment zone comprises multiple sets of electrodes and the electrical power has a voltage approximately proportional to a distance between adjacent sets of electrodes.

A method of peeling produce using the device of claim 1 comprising the steps of (1) determining a composition and temperature of the fluid;

(2) producing the determined fluid at the determined temperature;

(2) introducing the fluid to the container;

(3) determining a timing for the movement of the belt and causing the belt to move at the determined timing;

(4) placing the produce on the belt at intervals spaced by the dividers;

(5) determining a strength of an electrical field and energizing the electrodes to create the determined strength;

(6) introducing the produce to the fluid and the electrical field at a first end of the treatment zone;

(7) exposing the produce to the fluid and the electrical field for the time necessary for the produce to move through the treatment zone at the rate created by the determined timing of the belt;

(8) removing the peeled produce and a peel removed from the produce at an opposite end of the treatment zone; and (9) separating the peeled produce and the peel.

An apparatus for removing a peel from a produce comprising a tub holding a replaceable quantity of an electrically conductive fluid and at least one produce and comprising a treatment zone. The treatment zone comprising an upper barrier to contain the produce within the fluid. The apparatus comprises a belt comprised of a nonconductive material. The belt transports produce through the tub and the treatment zone. The belt comprises at least one divider. The apparatus comprises at least one variable power supply connected to at least one set of electrodes. The electrodes are fixed to a wall of the treatment zone and in electrical contact with the fluid such that when the electrodes are energized, an electrical current is produced in the fluid and the produce. The electrical current and fluid act on the produce to rupture a peel of the produce from an outer layer of flesh of the produce.

In an embodiment, (a) a height of the set of electrodes is equal to at least a height of the fluid in the treatment zone; (b) each electrode in a set are at a distance apart to permit passage of electrical current flowing between them through the fluid and the produce; and (c) the at least one divider causes the electrical current to form a tortuous path through the fluid and the produce. In an embodiment, the belt comprises at least one non conductive attachment that causes the electrical current to form a tortuous path through the fluid and the produce.

In an embodiment, the distance between an electrode set is proportional to the size of the treatment zone. An electrical voltage is regulated to be roughly in proportion to the distance between an electrode set. The voltage applied is regulated to achieve an optimal electric field strength within the treatment zone for peeling produce.

In an embodiment, the apparatus comprises a separator, which separates the fluid, the peeled produce, and the peel. In an embodiment, the apparatus comprises a fluid temperature control device. In an embodiment, the apparatus comprises a storage unit that stores the fluid when it is not in the tub.

In an embodiment, the apparatus comprises a non-electrical conducting watertight container capable of containing a fluid. The container comprising (a) a fluid inlet and a fluid outlet, the fluid inlet and fluid outlet connected to a storage container via tubing, (b) a treatment zone, the treatment zone comprising a non-electrically conductive upper barrier, and (c) at least one set of electrodes, the electrodes located at a first and second wall of the treatment zone and extending from a floor of the treatment zone to at least the height of the upper barrier. The electrode sets are arranged at intervals along a length of the treatment zone and interconnected to an electrical power source. Alternatively, the electrodes may be configured or positioned in any other way that accomplishes the peeling method according to the present invention; thus the present discussion is not intended to restrict the choice of electrode configurations that may be possible. In an embodiment, a continuous loop belt is connected to and powered by a belt power source. Alternatively, the belt is a basket or holder or configured in any other way that accomplishes the peeling method according to the present invention; thus the present discussion is not intended to restrict the choice of belt configurations that may be possible. The belt comprising at least one divider. The belt and dividers made of an electrically insulating material and capable of moving through the length of the treatment zone such that produce on the belt is spaced apart by the dividers, introduced to the treatment zone at a first end of the container, conveyed through the treatment zone on the belt and removed from the treatment zone and the container at an opposite end. A fluid pump circulates fluid to the container from a storage container.

A more complete, although not necessarily exhaustive, detailing of the features and embodiments of the invention is included in the following description and the claims. The above summary is not intended to be an exhaustive discussion of all the features or embodiments of the present invention.

As used herein, "peel" and "skin" are used interchangeably for the covering of a produce.

As used herein, "approximately" means within plus or minus 25% of the term it qualifies. The term "about" means between ½ and 2 times the term it qualifies.

All percentages, parts and ratios as used herein are by weight of the total composition, unless otherwise specified. All such weights as they pertain to listed ingredients are based on the active level and, therefore, do not include other products that may be included in commercially available materials, unless otherwise specified.

The compositions and methods of the present invention can comprise, consist of, or consist essentially of the essential elements and limitations of the invention described herein, as well as any additional or optional ingredients, components, or limitations described herein or otherwise useful in compositions and methods of the general type as described herein.

Numerical ranges as used herein are intended to include every number and subset of numbers contained within that range, whether specifically disclosed or not. Further, these numerical ranges should be construed as providing support for a claim directed to any number or subset of numbers in that range or to be limited to the exact conversion to a different measuring system, such, but not limited to, as between inches and millimeters.

DESCRIPTION OF THE PREFERRED EMBODIMENTS

Figure 1:
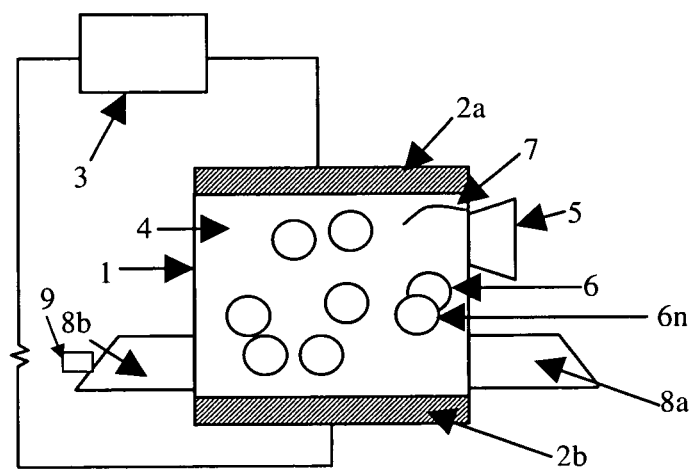
FIG. 1 is a diagrammatic representation of the apparatus of the present invention.

The present invention encompasses an apparatus and method for removing skins or peels from produce having peels, yielding a whole peeled product. As used herein, produce includes fruits, vegetables, and the like. The apparatus of the present invention comprises a container formed to contain and equipped to admit and discharge an electrically conductive fluid in which produce is immersed. An electrical system including electrodes is connected to a treatment zone in the container to provide a current to be applied to the fluid and the produce. The container may include a separator to separate the fluid from the processed produce and any produce particles. The apparatus may include a transporter or means to transport the produce through or in and out of the treatment zone of the container and a motion producer to create motion in the fluid-produce mixture.

In an embodiment of the present invention, produce, being a vegetable, fruit or nut having a fleshy interior and a barrier in the form of skin, such as a tomato, a pear, a pepper, a mango, an avocado, a pomegranate, a peach, a plum, a nectarine, an apple, a potato, a water chestnut, a grape or other food having similar skin structures. Any combination of the produce is submerged in an electrically conductive fluid. The fluid, which may be water or a solution, including but not limited to a solution comprising a salt, such as sodium chloride (NaCl) or other like compound; a mixture of a salt solution and/or a caustic solution, such as, but not limited to, an NaOH or KOH solution, or other similar solution, is subjected to ohmic heating. The term "ohmic heating" as used herein refers to any passing of a current through a fluid-substance mixture to create heat in areas of the substance in the fluid.

The method of ohmic heating in food processing has been described in previous references such as *Minimal Processing of Foods and Process Optimization: an Interface*; (Chapter 2: "Ohmic Heating"; R. P. Singh, F. A. R. Oliveira, Eds.: 17-33; CRC Press, Inc., 1994; Boca Raton, Fla.) and *McGraw-Hill Yearbook of Science and Technology* ("Ohmic Heating"; pp. 129-130; McGraw-Hill Book Company, 1996), each of which are incorporated herein by reference.

Ohmic heating is an efficient technique when used in food processing. Unlike conventional food processing methods such as canning, which relies heavily on external heat penetration of the food, ohmic heating uses the inherent electrical properties of the food to generate heat in areas other than the outer surface of the food when an electrical current is passed through the food. When the food-liquid system of the present invention is subjected to an electric current, non-uniform heating of the system occurs due to the heterogeneity of electrical properties inherent in the food and the fluid. The heating rate of the food-liquid system during ohmic heating is affected by factors such as, but not limited to, the voltage applied to the system, the distance between electrodes, the properties of the food, such as electrical conductivity, homogeneity, etc., and the properties of the liquid. The rate of heating is directly proportional to the square of the electric field strength (E), and the electrical conductivity ($\sigma$), where E is the voltage used divided by the distance between the electrodes.

Using ohmic heating as applied to the present invention, with time, the skin or peel of the produce ruptures from a buildup of pressure created by resultant heating caused by sub-epidermal electrical activity. Although minor internal heating may take place, the principal locus of heat build up is underneath the peel next to the outer flesh of the produce. After rupture, the peel and the remaining whole portion of the produce are removed from the fluid.

FIG. 1 depicts a diagrammatic representation of the apparatus of the present invention. The apparatus includes a container 1 with electrodes 2a, 2b connected to a variable power supply 3 and to the container 1 to create a current that flows through a fluid 4 and one or more produce 6, 6n contained in the container 1. In FIG. 1, the electrodes 2a, 2b encompass substantially the entire cross-sectional area occupied by the produce 6, 6n and the fluid 4 in order to apply optimal current to the produce 6, 6n; however, other electrode placement, size and area of contact may be used in the present invention. The container 1 may alternatively be a holder adapted to allow a batch of produce to be moved into the container, treated with fluid and subjected to current while in the holder, and then moved out of the holder.

The apparatus comprises a separator 9 or means for separating peeled produce and peel removed from the produce contained in the fluid from each other, the container, and the fluid. The separator 9 is any arrangement that results in the peeled produce existing substantially free from peel and fluid. The separator 9 may include, but is not limited to, a siphon, a strainer, a gravitational device, a screen, a scoop, liquid movement, and the like.

The fluid may comprise water, a salt solution, an alkaline solution, and mixtures thereof. Optionally, the container may include a motion inducer to induce fluid motion and or a conveyor or means to convey the produce through, or in or out of the container. A motion inducer may be, but is not limited to, one or more paddle, fan, or the like; a device that moves all or part of the container wall; introduction of a fluid or gas into the container; and the like.

A conveyor or means to convey 8a, 8b the produce through the container includes but is not limited to one or more conveyor belt, a sluice system, and the like. The conveyor 8a, 8b may alternatively be a system that moves all or a part of the container to accept the fluid and or the produce and then moves all or a part of the container after produce processing to remove the produce and or contents of the container.

One skilled in the art will understand that FIG. 1 and the description of the present invention herein are presented for purposes of illustration and that the physical design of the apparatus of the present invention should not be restricted to only one configuration, but rather may be of any configuration which essentially accomplishes the same effect, including but not limited to various configurations and placement of electrodes, the shape and configuration of the container, and the fluid used.

Fluids that yield optimal peeled produce in the invention are, but are not limited to, varying concentrations of a mixture of a salt solution with an alkaline solution. Examples of fluids used in the apparatus are mixtures of an NaCl solution with an NaOH solution and mixtures of an NaCl solution with a KOH solution, however, any like solution may be used. The fluid of the invention may also comprise the addition of other solutions, including but not limited to firming agents, such as calcium chloride, esterifying enzymes, etc., as well as other additives and agents.

Among the parameters affecting the system of the invention are: the electrical conductivity of the produce and differences in the conductivity within the produce itself; temperature, the design of the container, including the gap between electrodes; fluid motion; the residence time, distribution, and thermophysical properties of the produce; and electric field strength. Optimization of the peeling operation to achieve adequate peel removal without excessive yield loss of the remaining whole produce involves balancing these factors.

Method

The method of the invention for peeling a produce will now be described. For purposes of explaining this example of the invention, processing to remove the peel of a tomato is described, however, the invention is useful for removing the peel of any produce having a peel or skin.

Figure 2:
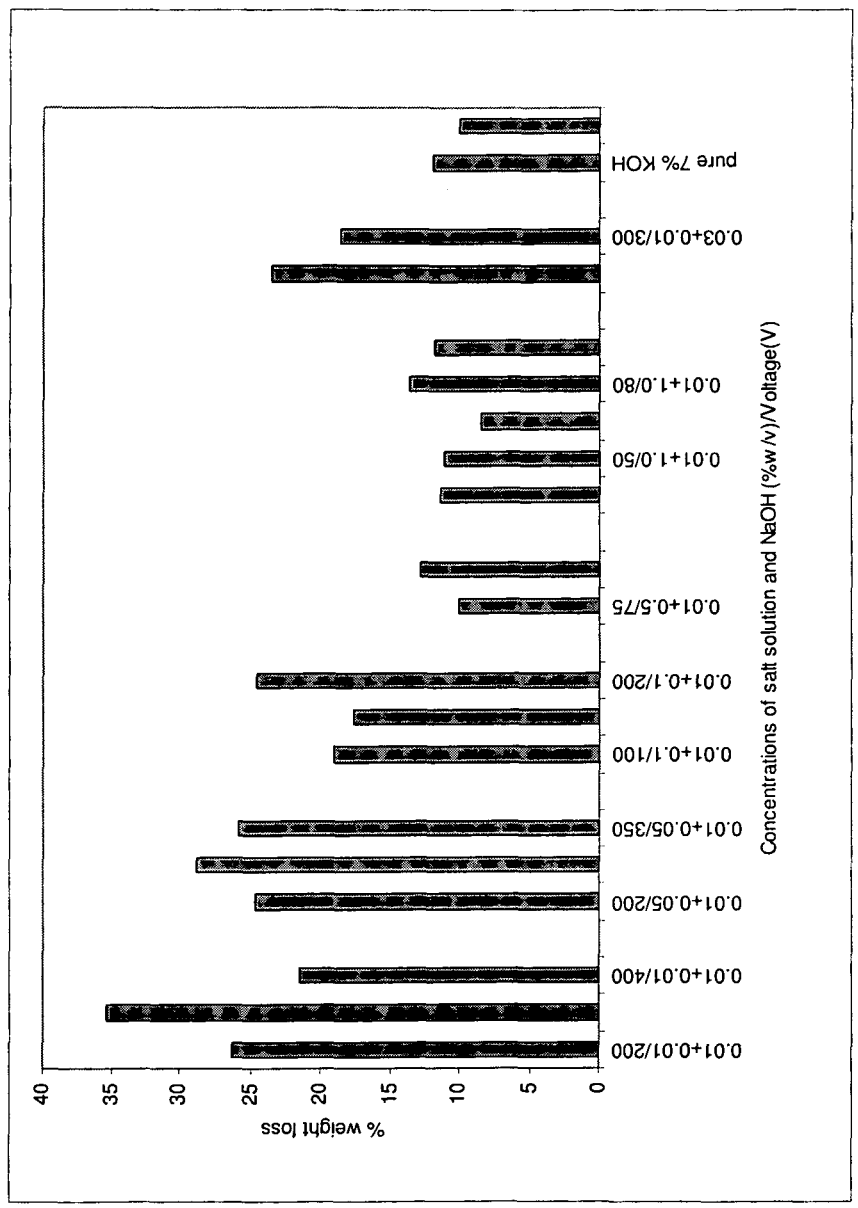
FIG. 2 is a chart depicting an embodiment of a comparison of percentages of weight loss of tomatoes peeled using NaOH in a salt solution mixture in different embodiments of the invention versus tomatoes peeled using conventional lye peeling.
Figure 3:
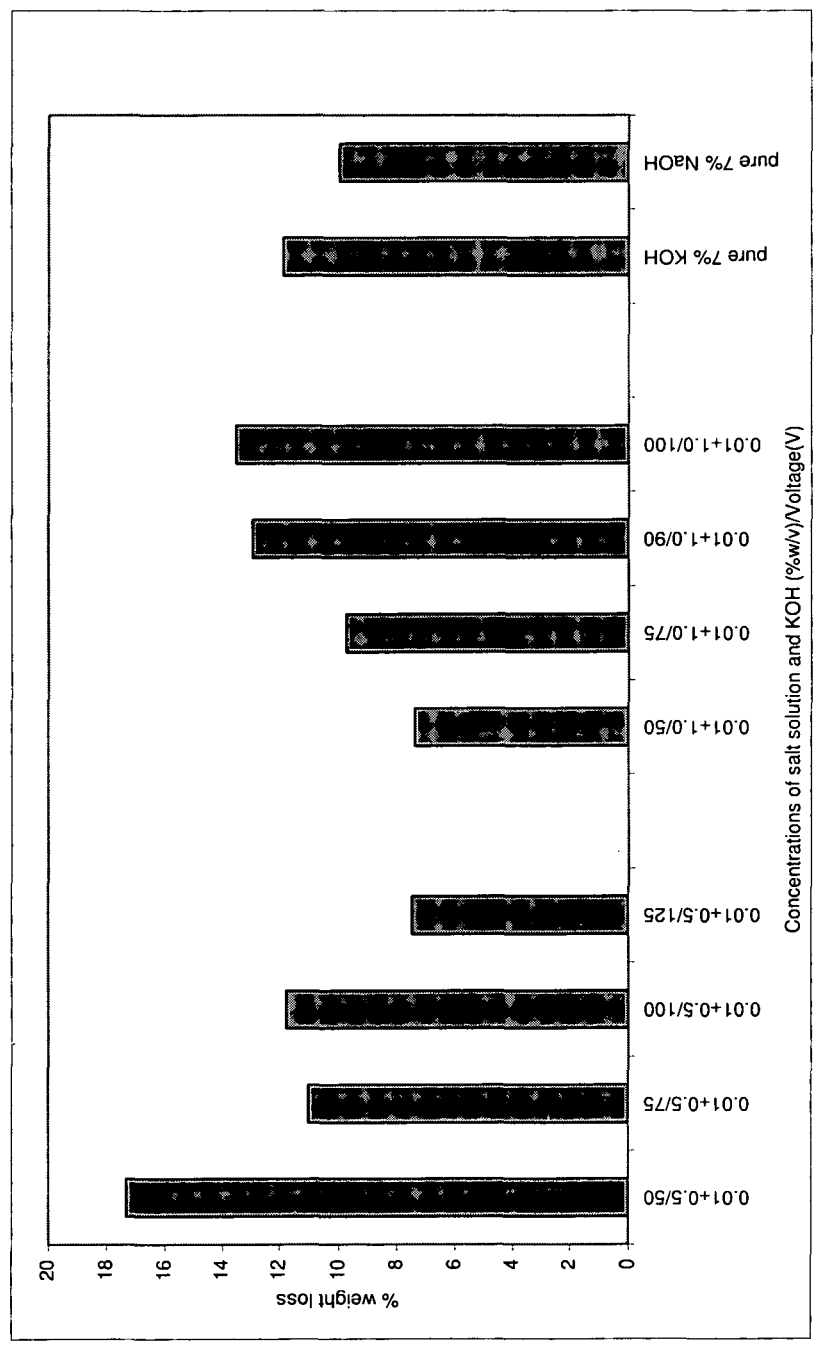
FIG. 3 is a chart of an embodiment depicting a comparison of percentages of weight loss of tomatoes peeled using KOH in a salt solution mixture in different embodiments of the invention versus tomatoes peeled using conventional lye peeling.

In an embodiment, one or more tomato is placed in a container including an electrically conductive liquid. As discussed above, the liquid may comprise varying concentrations of a mixture of a solution comprising a salt combined with an alkaline solution. Examples of fluids are mixtures of a salt solution with an NaOH solution and mixtures of a salt solution with a KOH solution, however, any like solution may be used. Acceptable salt solutions are NaCl and KCl; however other salts may be substituted and additional solutions may also be added to the salt solution-alkaline solution mixture. As shown in FIG. 2 fluids include a range of about 0.01 to about 0.03 salt solutions combined with various NaOH % w/v ranging from about 0.01 to about 1.0. Preferred mixtures include an about 0.01 salt solution with an about 1.0 NaOH solution and an about 0.01 salt solution with an about 0.5 NaOH solution. As shown in FIG. 3, fluids include an about 0.01 salt solution combined with various KOH % w/v ranging from about 0.5 to about 1.0.

Electrodes are connected to or associated with the treatment zone of the container. The electrodes are further connected to a variable power source. The power source is activated and an electrical current is produced through the produce and the fluid. The strength of the current applied to the fluid impacts the time to and amount of peel rupture. Voltages used depend upon the gap between the electrodes, the fluid used, and the conductivity of the produce.

Depending on the size of the treatment zone and the amount of and type of produce processed, desired electric field strengths vary based on the conductivity of the produce and the fluid used, the voltage, and the distance between electrodes. In an embodiment, voltages range from about 40V to about 400V. In an embodiment using a small sample, voltages range from about 50V to about 125V and the gap between the electrodes is about 6.2 cm. In this embodiment, the resulting electric field strength is equal to about 20.16 V/cm. Larger masses of produce require a greater gap between electrodes and may require different voltages.

When the power source is energized, current flows between the electrodes though the fluid and the produce. Where the electrical conductivity of the produce in the fluid is higher than that of the fluid, the produce heats faster than the fluid heats. Current channels through the more conductive parts of the produce, creating high current density regions. Higher energy generation rates occur as a result within given areas of the produce.

As an example, when tomatoes are used as produce in the fluid and subjected to an electrical field, two high current density regions, or boiling fronts, typically occur between the inside of the peel of the tomato and the outer flesh of the tomato: one starting from the blossom end of the tomato and one starting at the stem end of the tomato. With time, the boiling fronts advance under the skin surface and above the outer flesh portion of the tomato toward each other. The tomato peel eventually ruptures from the pressure buildup that results from the energy generation. The peel is then easily removed from the remaining flesh, resulting in a whole peeled tomato. While the boiling fronts occur in some instances, they do not occur in all cases, thus the practice of this invention is not to be interpreted as being restricted only to situations when boiling fronts occur.

Figure 6:
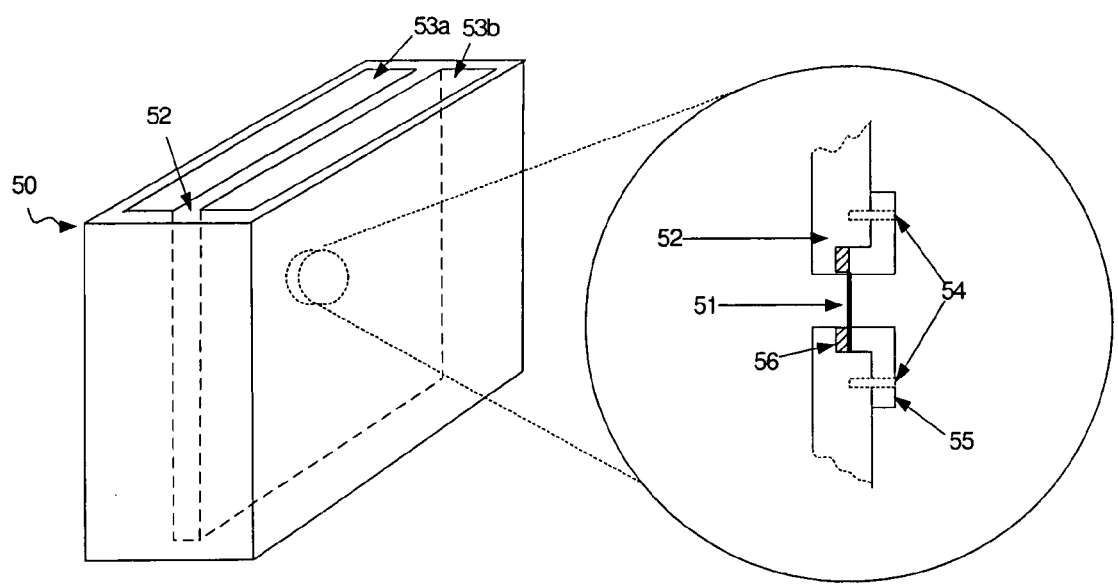
FIG. 6 is a diagrammatic representation of a measuring device to measure the diffusivity of solutions through produce in an embodiment using the skin of a tomato.

To determine the effectiveness of the process in an embodiment of the invention, a sample of tomato skin was held between two reservoirs 53a, 53b (as shown in FIG. 6), and the rate of diffusivity of solution through the skin was determined over time under ohmic heating conditions and without ohmic heating. In this example, sodium hydroxide was used; however, any suitable solution may be substituted.

As shown in FIG. 6, a tomato skin 51 was placed in a container 50 between two chambers 53a, 53b. A solution of NaOH was placed in the first chamber 53a at 50° C. The amount of NaOH in the second chamber 53b was measured at specific sampling times from approximately 0-1300 seconds under ohmic heating conditions and without ohmic heating.

Figure 7:
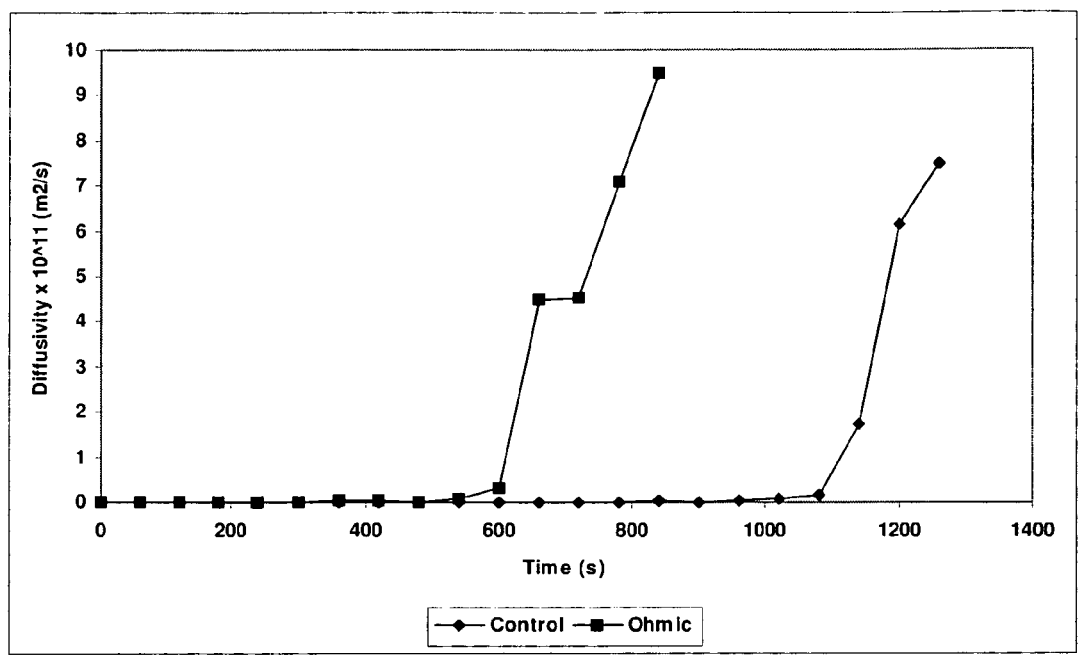
FIG. 7 is chart of an embodiment depicting diffusivity values of NaOH through the skin of a tomato over time in ohmic conditions versus control conditions at 50° C.

FIG. 7 is a chart of the results showing that the process of the invention accelerates the diffusivity of a solution such as sodium (or potassium) hydroxide through produce skin, such as a tomato. As shown in the chart of FIG. 7, when an electric field is applied, the diffusivity increased (due to cellular breakdown) in approximately one-half the time over diffusion of solution without ohmic heating, indicating a significant acceleration of the process.

The produce peeled, the composition of the solutions comprising the fluid, and the voltage applied to the fluid-produce system described above are among factors that effect the time necessary for a peel to rupture. The electrical conductivity of the particular produce selected to be peeled affects the rate of energy produced between the peel and the outer flesh, and thus the time to peel rupture. Increasing voltage causes the energy to build at a faster rate and cracking/rupture occurs sooner in time; however, increasing the voltage too much results in soft flesh of the remaining produce due to at least a partial invasion of the flesh by one or more boiling fronts, or by heat transfer to the flesh. Embodiments using voltages as described herein result in the removal of the peel while retaining an acceptable texture and appearance of the remaining flesh of the produce.

Other parameters, including but not limited to, the temperature of the fluid and fluid movement further effect the time to peel rupture. The initial temperature of the fluid impacts rupture rate. The standard temperature required for conventional lye process peeling is approximately 90° C., necessitating the application of a given amount of energy to achieve the required temperature. The method of the present invention allows for fluid temperatures at the initiation of processing of approximately room temperature (about 20° C. to about 25° C.), resulting in a fluid temperature after peeling typically in the range of about 75° C. to about 80° C.

FIG. 2 and FIG. 3 depict processing starting at room temperature. Higher or lower temperatures may be used as an initial temperature. Increasing the initial temperature of the fluid results in a more rapid rupture rate, due to the correlation between temperature and time. As the method of the present invention facilitates peeling at a lower temperature than that needed for conventional methods, the invention conserves energy as compared to conventional lye peeling methods.

The quality of peeling is a function of weight loss of the produce versus a complete removal of the peel of the produce. The present invention includes controlling parameters so not to cause the one or more boiling fronts or excessive heat transfer to invade the outer flesh proximate to the inside of the peel of the produce, which results in greater weight loss (i.e., flesh) during peeling and undesirable qualities, such as softness and color distortion, in the whole peeled produce. The invention obtains a clean removal of the peel, wherein the skin comes off, but the flesh underneath remains firm and relatively unaffected by the treatment.

Field strengths differ depending on whether a NaOH solution or a KOH solution is used. FIG. 2 depicts a comparison of percentages of total weight loss of produce processed using the present invention to remove the peel from the produce. In separate embodiments, differing amounts of various concentrations of a NaCl solution and a NaOH solution are mixed to form individual fluids. Certain of the fluids are then subjected to varying voltages.

As an example, tomatoes are measured and weighed before and after processing to remove the peel using various fluids comprising mixtures of various concentrations of a NaCl solution and a NaOH solution subjected to various voltages. FIG. 2 depicts the percent of weight loss of produce after processing in the different fluids at given voltages. FIG. 2 also depicts percent weight loss of tomatoes peeled using conventional lye peeling. Weight loss of produce processed using the invention were measured and compared with weight loss of produce processed using conventional peeling methods using the following formula:

$$\% \text{ Weight Loss} = \frac{\text{Produce wt. before peeling} - \text{produce wt. after peeling}}{\text{Produce wt. before peeling}} \times 100\%$$

As shown in FIG. 2, embodiments comprising fluids comprising mixtures of an about 0.01 salt solution combined with either an about 1.0 NaOH solution or an about 0.5 NaOH solution yield low percentages of weight loss when subjected to voltages of about 40V to about 100V. Embodiments comprising fluids comprising mixtures of an about 0.01 salt solution with an about 1.0 NaOH solution or an about 0.5 NaOH solution yield lower mass loss than produce peeled using either 7% NaOH or 7% KOH alone.

FIG. 3 depicts a comparison of percentages of weight loss of produce peeled in embodiments comprising a KOH solution and a salt solution at given voltages. FIG. 3 also shows weight loss of produce peeled using conventional lye peeling. As in the NaOH embodiments, any suitable salt may be used. As shown in FIG. 3, embodiments comprising fluids comprising mixtures of an about 0.01 salt solution combined with an about 1.0 KOH solution yield low percentages of weight loss of produce processed at voltages of about 50V to about 75V. An embodiment comprising a fluid comprising a mixture of an about 0.01 salt solution and an about 0.5 KOH solution yields a low percentage of weight loss of produce processed when subjected to a voltage from about 75V to about 125V. These embodiments yield lower produce mass loss than processing produce using either 7% NaOH or 7% KOH alone.

As shown by the Figures, optimum produce peeling is obtained using a fluid comprising a less concentrated alkaline solution than concentrations used in conventional lye peel removal processing. The present invention significantly reduces the requirement for adding neutralizing acid to the peeled produce or by-products of the processing method and reduces the impact to the environment from the discard of waste produced in the processing.

Additionally, the invention requires less fluid than that used in traditional peeling. Lye peeling requires a sufficient amount of a KOH or NaOH solution to transfer heat effectively to the produce. The present invention requires an amount of fluid only in sufficient quantity to form a continuous phase between the individual produce, reducing the amount of fluid required to remove the peel. This substantially reduces the quantity of liquid waste generated by the process. Because the present invention uses only small amounts of alkali, it is possible to recover larger fractions of peel than conventional processes, in which much of the peel is dissolved by the lye. The peel has economic value, and may be used in modified form within other products.

Figure 4:
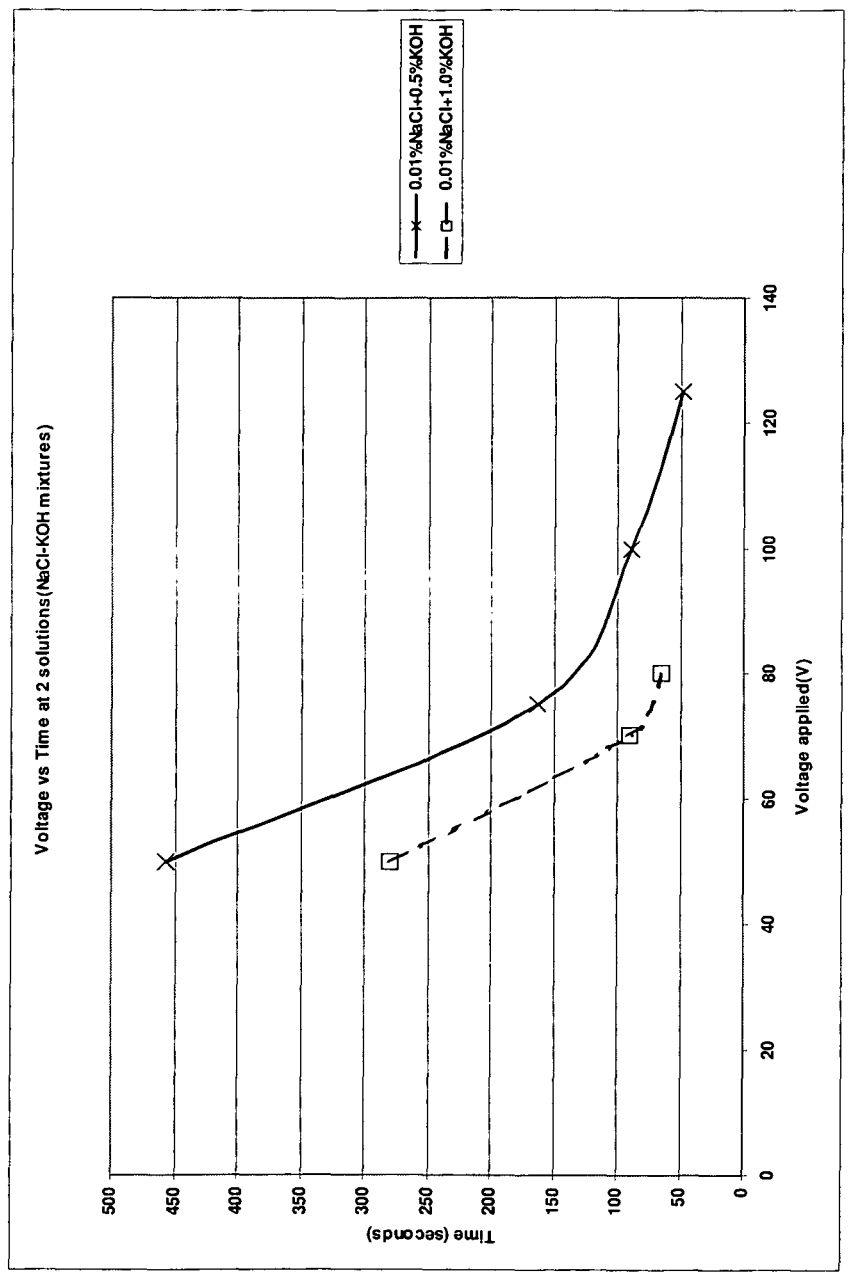
FIG. 4 is a chart of an embodiment depicting the relationship between voltage applied and time when cracking of tomato peel occurred in different sodium chloride (NaCl)/KOH mixture solutions.

FIG. 4 depicts embodiments using different voltages. In the present invention, the time to cracking/rupture of the peel of a produce is influenced by voltage applied. As examples, two different fluids comprising different mixtures of an NaCl solution and a KOH solution (about 0.01% NaCl with about 0.5% KOH; and about 0.01% NaCl with about 1.0% KOH) each containing a small sample of tomatoes, when subjected to voltages ranging from about 50V to about 125V produce decreased time to rupture of the peel using higher voltages. Embodiments comprising fluids comprising lower concentrations of KOH solutions produce cracking/rupture of the peel at less than about 100 seconds at voltages of about 90V to about 125V. An embodiment comprising an about 0.01% NaCl solution and an about 0.5% KOH solution produces cracking/rupture of the peel at about 50 seconds at a voltage of about 125V. Other embodiments comprising fluids comprising higher concentrations of KOH solutions produce cracking/rupture of the peel at less than about 100 seconds at voltages of about 70V to about 80V. An embodiment comprising an about 0.01% NaCl and an about 1.0% KOH produces cracking/rupture of the peel at about 60 seconds at a voltage of about 80V.

Figure 5:
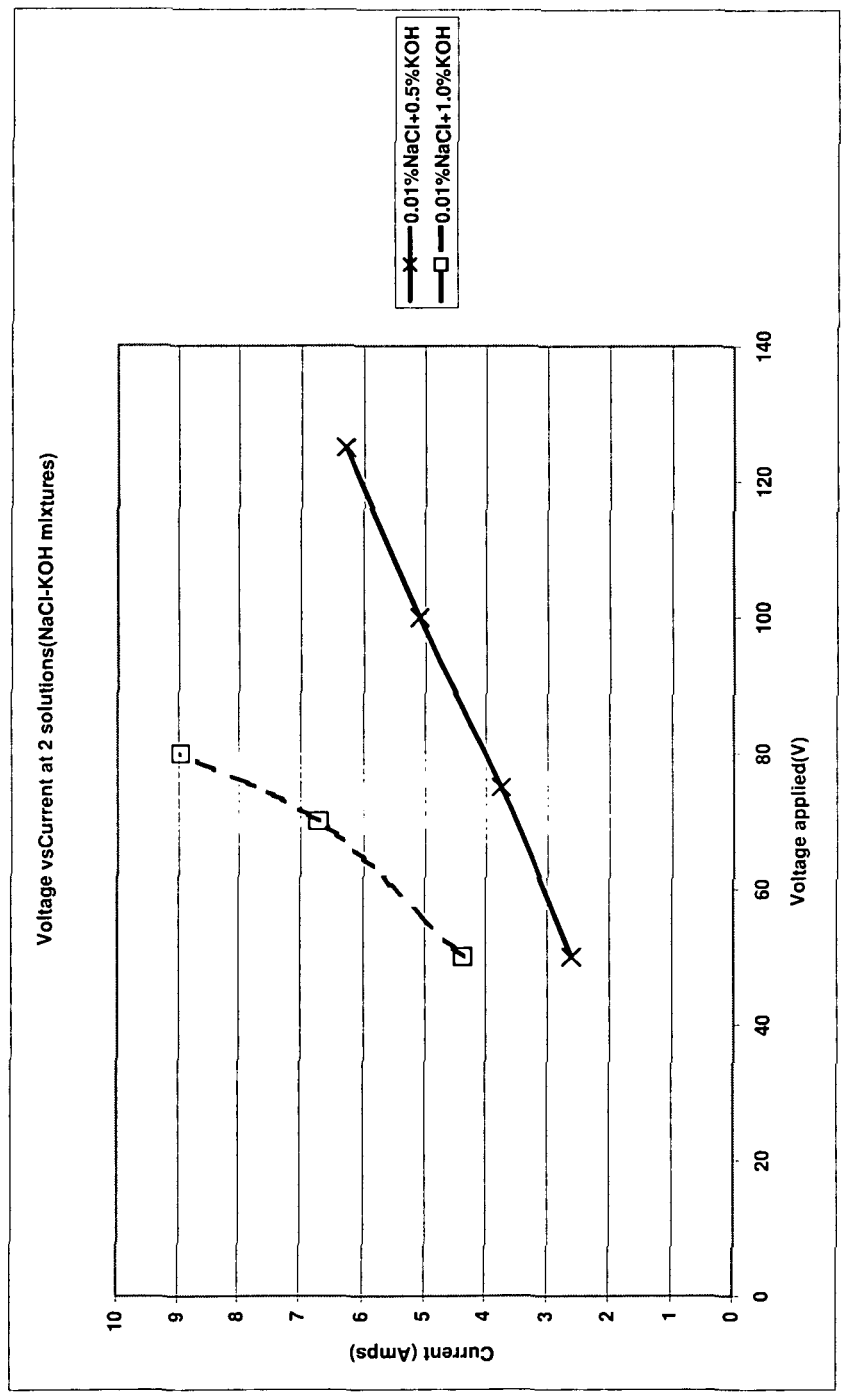
FIG. 5 is a chart of an embodiment depicting the relationship between voltage applied and current when cracking of tomato peel occurred in different NaCl/KOH mixture solutions.

FIG. 5 shows currents produced at the moment of cracking/rupture of the peel using different voltages and different fluids of the present invention. As an example, fluids comprising different mixtures of an NaCl solution with a KOH solution (about 0.01% NaCl with about 0.5% KOH; and about 0.01% NaCl with about 1.0% KOH) each containing a small sample of tomatoes, were subjected to voltages ranging from about 50V to about 125V. Current produced at the moment of cracking/rupture of the peel increases using higher voltages in each of the fluids. Embodiments comprising fluids comprising higher concentrations of KOH solutions produce currents at the moment of cracking/rupture of the peel ranging from about 4 amps to about 9 amps at voltages from about 50 V to about 80V. An embodiment comprising an about 0.01% NaCl solution and an about 1.0% KOH solution produces a current at the moment of cracking/rupture of the peel of about 4 amps using a voltage of about 50V. Embodiments comprising fluids comprising lower concentrations of KOH solutions produce currents at the moment of cracking/rupture of the peel ranging from about 2.5 amps to about 6 amps at voltages from about 50V to about 120V. An embodiment comprising an about 0.01% NaCl solution and an about 0.5% KOH solution produces a current at the moment of cracking/rupture of the peel of about 2.5 amps using a voltage of about 50V.

The following tables show various combinations of the invention:

TABLE I

| NaCl [ ] + NaOH (% w/v) | Voltage (V) | major axis a (cm) | minor axis b (cm) | surface area (cm2) | wt b/f thing (g), init | wt a/t hting w/o peel | Peel wt (g) | peel/init | wt loss per init (%) | Date |
|---|---|---|---|---|---|---|---|---|---|---|
| 0.01 + 0.05 | 350 | 5.1 | 3.65 | 13.94464 | 37.506 | 25.076 | 2.737 | 0.07297 | 33.14136 | 12/13 |
| 0.01 + 0.05 | 200 | 5.6 | 4.1 | 10.95579 | 52.152 | 46.439 | 3.331 | 0.06387 | 10.95452 | 12/13 |
| 0.01 + 1.0 | 40 | 5.85 | 3.8 | 18.82721 | 44.923 | 0 | 0 | 0 | 100 | 12/15 |
| 0.01 + 1.0 | 90 | 5.4 | 4 | 15.42894 | 48.265 | 42.623 | 3.377 | 0.06997 | 11.68963 | 12/15 |
| 0.01 + 0.01 | 400 | 5.9 | 4.15 | 18.77024 | 48.715 | 33.233 | 4.005 | 0.08221 | 31.78077 | 12/15 |
| 0.01 + 0.01 | 300 | 5.5 | 3.1 | 16.91377 | 38.791 | 25.163 | 2.781 | 0.07169 | 35.13186 | 12/15 |
| 0.01 + 0.01 | 200 | 5.8 | 4 | 18.24663 | 48.897 | 41.521 | 2.956 | 0.06045 | 15.08477 | 12/15 |
| 0.01 + 0.1 | 100 | 5.9 | 3.93 | 19.0492 | 50.867 | 41.648 | 1.797 | 0.03533 | 18.12373 | 1/8 |
| 0.01 + 0.1 | 200 | 6 | 3.8 | 19.89435 | 41.494 | 33.196 | 2.03 | 0.04892 | 19.99807 | 1/8 |

TABLE I-continued

| NaCl [ ] + NaOH (% w/v) | Voltage (V) | major axis a (cm) | minor axis b (cm) | surface area (cm2) | wt b/f hting (g), init | wt a/t hting w/o peel | Peel wt (g) | peel/init | wt loss per init (%) | Date |
|---|---|---|---|---|---|---|---|---|---|---|
| 0.01 + 0.1 | 150 | 5.45 | 4.05 | 15.69472 | 43.728 | 37.527 | 1.574 | 0.036 | 14.18085 | 1/8 |
| 0.01 + 0.5 | 100 | 5.83 | 4.5 | 17.6416 | 53.03 | 44.839 | 3.095 | 0.05836 | 15.44597 | 1/8 |
| 0.01 + 0.5 | 100 | 5.55 | 3.95 | 16.5456 | 43.14 | 37.586 | 2.599 | 0.06025 | 12.87436 | 1/8 |
| 0.01 + 0.5 | 75 | 6.12 | 3.85 | 20.72009 | 50.765 | 47.095 | 1.413 | 0.02783 | 7.22939 | 1/8 |
| 0.03 + 0.01 | 200 | 5.1 | 4 | 13.38424 | 44.338 | 33.906 | 2.839 | 0.06403 | 23.52835 | 1/9 |
| 0.03 + 0.01 | 300 | 5 | 4.3 | 12.04653 | 46.682 | 37.728 | 2.022 | 0.04331 | 19.18084 | 1/9 |
| 0.03 + 0.01 | 300 | 5.8 | 4.12 | 18.08143 | 45.476 | 37.332 | 2.279 | 0.05011 | 17.90835 | 1/9 |
| 0.01 + 0.1 | 100 | 5.4 | 3.9 | 15.58279 | 41.697 | 34.424 | 1.103 | 0.02645 | 17.4425 | 1/9 |
| 0.01 + 0.1 | 150 | 5.5 | 4 | 16.12332 | 41.475 | 35.168 | 1.615 | 0.03894 | 15.20675 | 1/9 |
| 0.01 + 0.1 | 200 | 6.05 | 3.3 | 20.48858 | 37.913 | 28.091 | 2.648 | 0.06984 | 25.90668 | 1/9 |
| 0.01 + 0.5 | 100 | 5.85 | 3.85 | 18.77742 | 48.081 | 43.878 | 1.571 | 0.03267 | 8.741499 | 1/9 |
| 0.01 + 0.5 | 75 | 5.8 | 3.65 | 18.60891 | 38.009 | 33.162 | 2.476 | 0.06514 | 12.75224 | 1/9 |
| 0.01 + 0.5 | 100 | 5.6 | 3.5 | 17.3656 | 37.228 | 31.959 | 1.904 | 0.05114 | 14.15333 | 1/9 |
| 0.01 + 1.0 | 75 | 5.5 | 4.3 | 15.59372 | 55.598 | 50.922 | 2.028 | 0.03648 | 8.410374 | 1/10 |
| 0.01 + 1.0 | 50 | 5.3 | 4.3 | 14.15813 | 47.987 | 41.747 | 1.525 | 0.03178 | 13.00352 | 1/10 |
| 0.01 + 0.01 | 200 | 5.6 | 4.65 | 15.54988 | 53.89 | 33.729 | 6.516 | 0.12091 | 37.41139 | 1/30 |
| 0.01 + 0.01 | 300 | 5.7 | 4.3 | 17.05354 | 58.038 | 37.352 | 3.724 | 0.06416 | 35.64217 | 1/30 |
| 0.01 + 0.01 | 400 | 5.5 | 4.5 | 15.15984 | 62.949 | 55.972 | 2.703 | 0.04294 | 11.08358 | 1/30 |
| 0.01 + 0.05 | 200 | 4.9 | 4.15 | 11.72209 | 41.062 | 25.282 | 3.131 | 0.07625 | 38.42969 | 1/30 |
| 0.01 + 0.05 | 300 | 5.4 | 4.7 | 13.8975 | 65.739 | 46.772 | 7.212 | 0.10971 | 28.85198 | 1/30 |
| 0.01 + 0.05 | 350 | 5.15 | 4.4 | 12.85383 | 54.717 | 44.55 | 5.027 | 0.09187 | 18.58106 | 1/30 |
| 0.01 + 0.1 | 100 | 5.65 | 4.1 | 17.02901 | 54.086 | 42.455 | 2.173 | 0.04018 | 21.50464 | 1/31 |
| 0.01 + 0.1 | 150 | 5.1 | 4.05 | 13.28823 | 43.306 | 33.169 | 1.86 | 0.04295 | 23.40784 | 1/31 |
| 0.01 + 0.1 | 200 | 5.2 | 4.3 | 13.44893 | 54.409 | 39.245 | 4.032 | 0.07411 | 27.87039 | 1/31 |
| 0.01 + 1.0 | 40 | 5.5 | 4.45 | 15.27458 | 59.804 | 53.004 | 1.914 | 0.032 | 11.37048 | 1/31 |
| 0.01 + 1.0 | 50 | 5.5 | 4.5 | 15.15984 | 56.598 | 51.454 | 1.381 | 0.0244 | 9.08866 | 1/31 |
| 0.01 + 1.0 | 80 | 5.85 | 4.05 | 18.54225 | 53.903 | 46.592 | 3.633 | 0.0674 | 13.56325 | 1/31 |

TABLE II

| NaCl [ ] + KOH (% w/v) | Voltage (V) | major axis a (cm) | minor axis b (cm) | surface area (cm2) | wt b/f hting (g), init | wt a/t hting w/o peel | Peel wt (g) | peel/init | wt loss per init (%) | Date |
|---|---|---|---|---|---|---|---|---|---|---|
| 0.01 + 0.5 | 50 | 5.65 | 4.1 | 17.02901 | 52.48 | 41.844 | 1.593 | 0.03035 | 20.26677 | 1/14 |
| 0.01 + 0.5 | 75 | 5.5 | 4.25 | 15.6919 | 50.382 | 46.206 | 1.114 | 0.02211 | 8.288675 | 1/14 |
| 0.01 + 0.5 | 100 | 5.45 | 4.6 | 14.54199 | 55.99 | 51.097 | 1.062 | 0.01897 | 8.739061 | 1/14 |
| 0.01 + 1.0 | 50 | 5.9 | 4.1 | 18.83989 | 56.614 | 52.776 | 1.283 | 0.02266 | 6.779242 | 1/14 |
| 0.01 + 1.0 | 75 | 4.95 | 4.3 | 11.69904 | 48.572 | 44.18 | 1.106 | 0.02277 | 9.042247 | 1/14 |
| 0.01 + 1.0 | 76.4 | 5.4 | 3.95 | 15.50778 | 47.278 | 42.892 | 1.854 | 0.03921 | 9.277042 | 1/14 |
| 0.01 + 0.5 | 75 | 4.85 | 4.05 | 11.61396 | 41.765 | 35.425 | 2.06 | 0.04932 | 15.18017 | 1/16 |
| 0.01 + 0.5 | 100 | 5.4 | 3.55 | 16.00335 | 41.622 | 33.905 | 2.478 | 0.05954 | 18.54068 | 1/16 |
| 0.01 + 0.5 | 125 | 5.5 | 4.2 | 10.83214 | 39.295 | 34.594 | 1.886 | 0.048 | 11.96335 | 1/16 |
| 0.01 + 1.0 | 75 | 5.6 | 4.1 | 10.95579 | 52.152 | 46.439 | 3.331 | 0.06387 | 10.95452 | 1/16 |
| 0.01 + 1.0 | 100 | 5.5 | 4.3 | 10.97372 | 56.311 | 46.218 | 4.991 | 0.08863 | 17.92367 | 1/16 |
| 0.01 + 0.5 | 50 | 5.2 | 4.15 | 13.77292 | 42.069 | 36.234 | 1.034 | 0.02458 | 13.87007 | 2/4 |
| 0.01 + 0.5 | 50 | 5.15 | 4.2 | 13.32148 | 57.567 | 47.276 | 1.772 | 0.03078 | 17.87656 | 2/4 |
| 0.01 + 0.5 | 75 | 5.3 | 4.2 | 14.3688 | 55.533 | 50.174 | 1.882 | 0.03389 | 9.650118 | 2/4 |
| 0.01 + 0.5 | 100 | 4.95 | 4.1 | 12.17215 | 46.243 | 42.487 | 1.89 | 0.04087 | 8.12231 | 2/4 |
| 0.01 + 0.5 | 125 | 5.15 | 4.5 | 12.59333 | 54.854 | 49.244 | 1.537 | 0.02802 | 10.22715 | 2/4 |
| 0.01 + 0.5 | 125 | 5.25 | 3.95 | 14.48479 | 46.078 | 42.596 | 1.379 | 0.02993 | 7.556752 | 2/4 |
| 0.01 + 1.0 | 50 | 4.65 | 4.6 | 8.67431 | 51.762 | 49.091 | 0.667 | 0.01289 | 5.160156 | 2/4 |
| 0.01 + 1.0 | 50 | 5 | 4.45 | 11.65205 | 56.453 | 50.67 | 2.417 | 0.04281 | 10.24392 | 2/4 |
| 0.01 + 1.0 | 100 | 5.35 | 3.8 | 15.385 | 41.765 | 37.95 | 1.034 | 0.02476 | 9.134443 | 2/4 |
| 0.01 + 1.0 | 90 | 5 | 4 | 12.71496 | 46.4 | 40.408 | 2.945 | 0.06347 | 12.91379 | 2/4 |
| NaCl/CaCl2 | | | | | | | | | | |
| 0.01 + 1.0 | 100 | 5.45 | 3.85 | 15.99415 | 42.205 | 37.877 | 3.197 | 0.07575 | 10.25471 | 4/11 |
| 0.01 + 1.0 | 125 | 5.6 | 4.22 | 16.46859 | 55.199 | 44.448 | 4.31 | 0.07808 | 19.4768 | 4/11 |
| 0.01 + 1.0 | 150 | 5.8 | 4.4 | 17.61102 | 60.246 | 52.129 | 4.016 | 0.06666 | 13.47309 | 4/11 |
| 0.01 + 2.0 | 75 | 5.55 | 4.1 | 16.31636 | 51.441 | 45.876 | 3.087 | 0.06001 | 10.81822 | 4/11 |
| 0.01 + 2.0 | 100 | | | | No cracking | | | | | 4/11 |
| 0.01 + 2.0 | 125 | | | | No cracking | | | | | 4/11 |
| NaCl/NaOH/CaCl2 | | | | | | | | | | |
| 0.01 + 0.5 + 0.2 | 50 | 5.1 | 3.9 | 13.56406 | 45.385 | 39.782 | 1.556 | 0.03428 | 12.34549 | 2/7 |
| 0.01 + 0.5 + 0.2 | 75 | 5 | 3.95 | 12.81147 | 41.504 | 35.724 | 1.93 | 0.0465 | 13.92637 | 2/7 |
| 0.01 + 0.5 + 0.2 | 100 | 4.75 | 4.15 | 10.71426 | 46.122 | 39.582 | 2.366 | 0.0513 | 14.17978 | 2/7 |
| 0.01 + 0.5 + 0.5 | 75 | 5.2 | 4.05 | 13.96807 | 42.267 | 36.398 | 2.084 | 0.04931 | 13.88554 | 2/7 |

TABLE II-continued

| NaCl [ ] + KOH (% w/v) | Voltage (V) | major axis a (cm) | minor axis b (cm) | surface area (cm2) | wt b/f hting (g), init | wt a/t hting w/o peel | Peel wt (g) | peel/init | wt loss per init (%) | Date |
|---|---|---|---|---|---|---|---|---|---|---|
| Pure KOH | | | | | | | | | | |
| 7% | 90 C. on hot plate | 4.3 | 4.1 | 7.2341 | 35.947 | 30.948 | 0.948 | 0.02637 | 13.90658 | 1/21 |
| 7% | double beaker | 5.65 | 4.5 | 16.27996 | 54.227 | 48.838 | 1.903 | 0.03509 | 9.937854 | 1/24 |
| Pure NaOH | | | | | | | | | | |
| 7% | hot plate | 4.6 | 4.45 | 8.295821 | 56.668 | 50.884 | 3.649 | 0.06439 | 10.20682 | 1/21 |
| 7% | double beaker | 5.3 | 4.7 | 13.14188 | 61.432 | 55.438 | 1.541 | 0.02508 | 9.75713 | 1/24 |

TABLE III

| NaCl [ ] + NaOH (% w/v) | Voltage (V) | major axis a (cm) | minor axis b (cm) | surface area (cm2) | wt b/f hting (g), init | wt a/t hting w/o peel | Peel wt (g) | peel/init | wt loss per init (%) | Date |
|---|---|---|---|---|---|---|---|---|---|---|
| 0.01 + 0.01 | 200 | 5.6 | 4.65 | 15.54988 | 53.89 | 33.729 | 6.516 | 0.12091 | 37.41139 | 1/30 |
| 0.01 + 0.01 | 200 | 5.8 | 4 | 18.24663 | 48.897 | 41.521 | 2.956 | 0.06045 | 15.08477 | 12/15 |
| 0.01 + 0.01 | 300 | 5.5 | 3.1 | 16.91377 | 38.791 | 25.163 | 2.781 | 0.07169 | 35.13186 | 12/15 |
| 0.01 + 0.01 | 300 | 5.7 | 4.3 | 17.05354 | 58.038 | 37.352 | 3.724 | 0.06416 | 35.64217 | 1/30 |
| 0.01 + 0.01 | 400 | 5.5 | 4.5 | 15.15984 | 62.949 | 55.972 | 2.703 | 0.04294 | 11.08358 | 1/30 |
| 0.01 + 0.01 | 400 | 5.9 | 4.15 | 18.77024 | 48.715 | 33.233 | 4.005 | 0.08221 | 31.78077 | 12/15 |
| 0.01 + 0.05 | 200 | 5.6 | 4.1 | 10.95579 | 52.152 | 46.439 | 3.331 | 0.06387 | 10.95452 | 12/13 |
| 0.01 + 0.05 | 200 | 4.9 | 4.15 | 11.72209 | 41.062 | 25.282 | 3.131 | 0.07625 | 38.42969 | 1/30 |
| 0.01 + 0.05 | 300 | 5.4 | 4.7 | 13.8975 | 65.739 | 46.772 | 7.212 | 0.10971 | 28.85198 | 1/30 |
| 0.01 + 0.05 | 350 | 5.1 | 3.65 | 13.94464 | 37.506 | 25.076 | 2.737 | 0.07297 | 33.14136 | 12/13 |
| 0.01 + 0.05 | 350 | 5.15 | 4.4 | 12.85383 | 54.717 | 44.55 | 5.027 | 0.09187 | 18.58106 | 1/30 |
| 0.01 + 0.1 | 100 | 5.65 | 4.1 | 17.02901 | 54.086 | 42.455 | 2.173 | 0.04018 | 21.50464 | 1/31 |
| 0.01 + 0.1 | 100 | 5.4 | 3.9 | 15.58279 | 41.697 | 34.424 | 1.103 | 0.02645 | 17.4425 | 1/9 |
| 0.01 + 0.1 | 100 | 5.9 | 3.93 | 19.0492 | 50.867 | 41.648 | 1.797 | 0.03533 | 18.12373 | 1/8 |
| 0.01 + 0.1 | 150 | 5.45 | 4.05 | 15.69472 | 43.728 | 37.527 | 1.574 | 0.036 | 14.18085 | 1/8 |
| 0.01 + 0.1 | 150 | 5.5 | 4 | 16.12332 | 41.475 | 35.168 | 1.615 | 0.03894 | 15.20675 | 1/9 |
| 0.01 + 0.1 | 150 | 5.1 | 4.05 | 13.28823 | 43.306 | 33.169 | 1.86 | 0.04295 | 23.40784 | 1/31 |
| 0.01 + 0.1 | 200 | 5.2 | 4.3 | 13.44893 | 54.409 | 39.245 | 4.032 | 0.07411 | 27.87039 | 1/31 |
| 0.01 + 0.1 | 200 | 6.05 | 3.3 | 20.48858 | 37.913 | 28.091 | 2.648 | 0.06984 | 25.90668 | 1/9 |
| 0.01 + 0.1 | 200 | 6 | 3.8 | 19.89435 | 41.494 | 33.196 | 2.03 | 0.04892 | 19.99807 | 1/8 |
| 0.01 + 0.5 | 75 | 6.12 | 3.85 | 20.72009 | 50.765 | 47.095 | 1.413 | 0.02783 | 7.22939 | 1/8 |
| 0.01 + 0.5 | 75 | 5.8 | 3.65 | 18.60891 | 38.009 | 33.162 | 2.476 | 0.06514 | 12.75224 | 1/9 |
| 0.01 + 0.5 | 100 | 5.85 | 3.85 | 18.77742 | 48.081 | 43.878 | 1.571 | 0.03267 | 8.741499 | 1/9 |
| 0.01 + 0.5 | 100 | 5.6 | 3.5 | 17.3656 | 37.228 | 31.959 | 1.904 | 0.05114 | 14.15333 | 1/9 |
| 0.01 + 0.5 | 100 | 5.83 | 4.5 | 17.6416 | 53.03 | 44.839 | 3.095 | 0.05836 | 15.44597 | 1/8 |
| 0.01 + 0.5 | 100 | 5.55 | 3.95 | 16.5456 | 43.14 | 37.586 | 2.599 | 0.06025 | 12.87436 | 1/8 |
| 0.01 + 1.0 | 40 | 5.5 | 4.45 | 15.27458 | 59.804 | 53.004 | 1.914 | 0.032 | 11.37048 | 1/31 |
| 0.01 + 1.0 | 40 | 5.85 | 3.8 | 18.82721 | 44.923 | 0 | 0 | 0 | 100 | 12/15 |
| 0.01 + 1.0 | 50 | 5.3 | 4.3 | 14.15813 | 47.987 | 41.747 | 1.525 | 0.03178 | 13.00352 | 1/10 |
| 0.01 + 1.0 | 50 | 5.5 | 4.5 | 15.15984 | 56.598 | 51.454 | 1.381 | 0.0244 | 9.08866 | 1/31 |
| 0.01 + 1.0 | 75 | 5.5 | 4.3 | 15.59372 | 55.598 | 50.922 | 2.028 | 0.03648 | 8.410374 | 1/10 |
| 0.01 + 1.0 | 80 | 5.85 | 4.05 | 18.54225 | 53.903 | 46.592 | 3.633 | 0.0674 | 13.56325 | 1/31 |
| 0.01 + 1.0 | 90 | 5.4 | 4 | 15.42894 | 48.265 | 42.623 | 3.377 | 0.06997 | 11.68963 | 12/15 |
| 0.03 + 0.01 | 200 | 5.1 | 4 | 13.38424 | 44.338 | 33.906 | 2.839 | 0.06403 | 23.52835 | 1/9 |
| 0.03 + 0.01 | 300 | 5 | 4.3 | 12.04653 | 46.682 | 37.728 | 2.022 | 0.04331 | 19.18084 | 1/9 |
| 0.03 + 0.01 | 300 | 5.8 | 4.12 | 18.08143 | 45.476 | 37.332 | 2.279 | 0.05011 | 17.90835 | 1/9 |

TABLE IV

| NaCl [ ] + NaOH (% w/v) | Voltage (V) | wt loss per init (%) | NaCl [ ] + NaOH (% w/v) | Voltage (V) | wt loss per init (%) | NaCl [ ] + NaOH (% w/v) | Voltage (V) | wt loss per init (%) | NaCl [ ] + NaOH (% w/v) | Voltage (V) | wt loss per init (%) |
|---|---|---|---|---|---|---|---|---|---|---|---|
| 0.01 + 0.01 | 200 | 26.24808 | 0.01 + 0.01/200 | 200 | 26.248 | 0.01 + 0.1 | 200 | 24.59171 | 0.01 + 0.1/200 | 200 | 24.592 |
| 0.01 + 0.01 | 300 | 35.38701 | 0.01 + 0.01/300 | 300 | 35.387 | 0.01 + 0.5 | 75 | 9.990817 | 0.01 + 0.5/75 | 75 | 9.9908 |
| 0.01 + 0.01 | 400 | 21.43217 | 0.01 + 0.01/400 | 400 | 21.432 | 0.01 + 0.5 | 100 | 12.80379 | 0.01 + 0.5/100 | 100 | 12.804 |
| 0.01 + 0.05 | 200 | 24.6921 | 0.01 + 0.05/200 | 200 | 24.692 | 0.01 + 1.0 | 40 | 11.37048 | 0.01 + 1.0/40 | 40 | 11.37 |
| 0.01 + 0.05 | 300 | 28.85198 | 0.01 + 0.05/300 | 300 | 28.852 | 0.01 + 1.0 | 50 | 11.04609 | 0.01 + 1.0/50 | 50 | 11.046 |
| 0.01 + 0.05 | 350 | 25.86121 | 0.01 + 0.05/350 | 350 | 25.861 | 0.01 + 1.0 | 75 | 8.410374 | 0.01 + 1.0/75 | 75 | 8.4104 |
| 0.01 + 0.1 | 100 | 19.02363 | 0.01 + 0.1/100 | 100 | 19.024 | 0.01 + 1.0 | 80 | 13.56325 | 0.01 + 1.0/80 | 80 | 13.563 |
| 0.01 + 0.1 | 150 | 17.59848 | 0.01 + 0.1/150 | 150 | 17.598 | 0.01 + 1.0 | 90 | 11.68963 | 0.01 + 1.0/90 | 90 | 11.69 |

TABLE IV-continued

| NaCl [ ] + NaOH (% w/v) | Voltage (V) | wt loss per init (%) | NaCl [ ] + NaOH (% w/v) | Voltage (V) | wt loss per init (%) |
|---|---|---|---|---|---|
| 0.03 + 0.01 | 200 | 23.52835 | 0.03 + 0.01/200 | 200 | 23.528 |
| 0.03 + 0.01 | 300 | 18.54459 | 0.03 + 0.01/300 | 300 | 18.545 |
| | | pure 7% KOH | | | 11.922 |
| | | pure 7% NaOH | | | 9.982 |

TABLE V

| NaCl [ ] + KOH (% w/v) | Voltage (V) | major axis a (cm) | minor axis b (cm) | surface area (cm2) | wt b/f hting (g), init | wt a/t hting w/o peel | Peel wt (g) | peel/init | wt loss per init (%) | Date |
|---|---|---|---|---|---|---|---|---|---|---|
| 0.01 + 0.5 | 50 | 5.65 | 4.1 | 17.02901 | 52.48 | 41.844 | 1.593 | 0.03035 | 20.26677 | 1/14 |
| 0.01 + 0.5 | 50 | 5.2 | 4.15 | 13.77292 | 42.069 | 36.234 | 1.034 | 0.02458 | 13.87007 | 2/4 |
| 0.01 + 0.5 | 50 | 5.15 | 4.2 | 13.32148 | 57.567 | 47.276 | 1.772 | 0.03078 | 17.87656 | 2/4 |
| 0.01 + 0.5 | 75 | 5.3 | 4.2 | 14.3688 | 55.533 | 50.174 | 1.882 | 0.03389 | 9.650118 | 2/4 |
| 0.01 + 0.5 | 75 | 4.85 | 4.05 | 11.61396 | 41.765 | 35.425 | 2.06 | 0.04932 | 15.18017 | 1/16 |
| 0.01 + 0.5 | 75 | 5.5 | 4.25 | 15.6919 | 50.382 | 46.206 | 1.114 | 0.02211 | 8.288675 | 1/14 |
| 0.01 + 0.5 | 100 | 5.45 | 4.6 | 14.54199 | 55.99 | 51.097 | 1.062 | 0.01897 | 8.739061 | 1/14 |
| 0.01 + 0.5 | 100 | 4.95 | 4.1 | 12.17215 | 46.243 | 42.487 | 1.89 | 0.04087 | 8.12231 | 2/4 |
| 0.01 + 0.5 | 100 | 5.4 | 3.55 | 16.00335 | 41.622 | 33.905 | 2.478 | 0.05954 | 18.54068 | 1/16 |
| 0.01 + 0.5 | 125 | 5.5 | 4.2 | 10.83214 | 39.295 | 34.594 | 1.886 | 0.048 | 11.96335 | 1/16 |
| 0.01 + 0.5 | 125 | 5.15 | 4.5 | 12.59333 | 54.854 | 49.244 | 1.537 | 0.02802 | 10.22715 | 2/4 |
| 0.01 + 0.5 | 125 | 5.25 | 3.95 | 14.48479 | 46.078 | 42.596 | 1.379 | 0.02993 | 7.556752 | 2/4 |
| 0.01 + 1.0 | 50 | 4.65 | 4.6 | 8.67431 | 51.762 | 49.091 | 0.667 | 0.01289 | 5.160156 | 2/4 |
| 0.01 + 1.0 | 50 | 5 | 4.45 | 11.65205 | 56.453 | 50.67 | 2.417 | 0.04281 | 10.24392 | 2/4 |
| 0.01 + 1.0 | 50 | 5.9 | 4.1 | 18.83989 | 56.614 | 52.776 | 1.283 | 0.02266 | 6.779242 | 1/14 |
| 0.01 + 1.0 | 75 | 4.95 | 4.3 | 11.69904 | 48.572 | 44.18 | 1.106 | 0.02277 | 9.042247 | 1/14 |
| 0.01 + 1.0 | 76.4 | 5.4 | 3.95 | 15.50778 | 47.278 | 42.892 | 1.854 | 0.03921 | 9.277042 | 1/14 |
| 0.01 + 1.0 | 75 | 5.6 | 4.1 | 10.95579 | 52.152 | 46.439 | 3.331 | 0.06387 | 10.95452 | 1/16 |
| 0.01 + 1.0 | 90 | 5 | 4 | 12.71496 | 46.4 | 40.408 | 2.945 | 0.06347 | 12.91379 | 2/4 |
| 0.01 + 1.0 | 100 | 5.5 | 4.3 | 10.97372 | 56.311 | 46.218 | 4.991 | 0.08863 | 17.92367 | 1/16 |
| 0.01 + 1.0 | 100 | 5.35 | 3.8 | 15.385 | 41.765 | 37.95 | 1.034 | 0.02476 | 9.134443 | 2/4 |

TABLE VI

| NaCl [ ] + KOH (% w/v) | Voltage (V) | wt loss per init (%) | NaCl [ ] + KOH (% w/v) | Voltage (V) | wt loss per init (%) |
|---|---|---|---|---|---|
| 0.01 + 0.5 | 50 | 17.3378 | 0.01 + 0.5/50 | 50 | 17.3378 |
| 0.01 + 0.5 | 75 | 11.03966 | 0.01 + 0.5/75 | 75 | 11.0397 |
| 0.01 + 0.5 | 100 | 11.80068 | 0.01 + 0.5/100 | 100 | 11.8007 |
| 0.01 + 0.5 | 125 | 7.464294 | 0.01 + 0.5/125 | 125 | 7.46429 |
| 0.01 + 1.0 | 50 | 7.394439 | 0.01 + 1.0/50 | 50 | 7.39444 |
| 0.01 + 1.0 | 75 | 9.757935 | 0.01 + 1.0/75 | 75 | 9.75794 |
| 0.01 + 1.0 | 90 | 12.91379 | 0.01 + 1.0/90 | 90 | 12.9138 |
| 0.01 + 1.0 | 100 | 13.52906 | 0.01 + 1.0/100 | 100 | 13.5291 |
| | | pure 7% KOH | | | 11.9222 |
| | | pure 7% NaOH | | | 9.98197 |
| | | NaCl/CaCl2 | | | |
| 0.01 + 1.0 | 100 | 10.25471 | | | |
| 0.01 + 1.0 | 125 | 19.4768 | | | |
| 0.01 + 1.0 | 150 | 13.47309 | | | |
| | | NaCl/NaOH/CaCl2 | | | |
| 0.01 + 0.5 + 0.2 | 50 | 12.34549 | | | |
| 0.01 + 0.5 + 0.2 | 75 | 13.92637 | | | |
| 0.01 + 0.5 + 0.2 | 100 | 14.17978 | | | |
| Pure KOH | | average | | | |
| 7% | 13.907 | 11.92222 | | | |
| 7% | 9.9379 | | | | |
| | | Pure NaOH | | | |
| 7% | 10.207 | 9.981974 | | | |
| 7% | 9.7571 | | | | |

Continuous Flow/Batch

Figure 8:
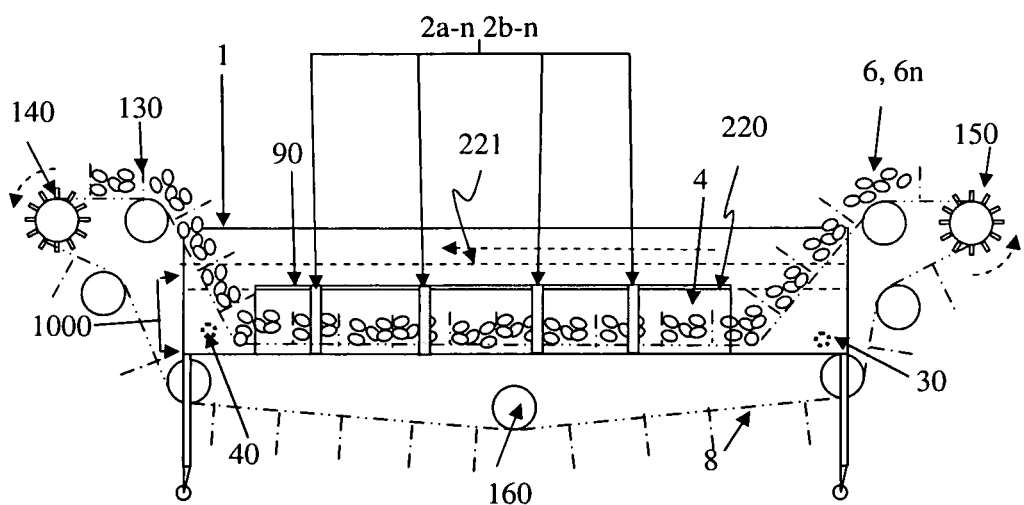
FIG. 8 is a side view of an embodiment of a continuous flow/batch device of the present invention.

Referring now to FIG. 8, an embodiment of a continuous flow device of the invention is now described. In an embodiment, the continuous flow device comprises a container or tub 1. Alternatively, The tub 1 is a watertight container made of any non-conducting material in which all static or continuous flow process occur. In an embodiment, the tub 1 is made from an electrically insulating material. Electrically insulating materials as defined herein include but are not limited to, natural and synthetic rubbers in reinforced or non-reinforced configurations; thermoset or thermoplastic polymers, neat or blended, in reinforced or non-reinforced configurations; reinforcements can include fibers in strand or chopped form from families of glass and polymers and mats and webs from such. Preferred electrically insulating material is polypropylene. The tub 1 is capable of containing a fluid. The tub 1 comprises a fluid inlet 30 and a fluid outlet 40. Alternatively, the fluid may enter at 40 and exit at 30, depending on requirements, such as the produce to be processed, fluid temperature, container set up, and the like. The fluid inlet 30 and fluid outlet 40 are connected to a storage container 170 (see FIG. 9) via tubing. Fluid is re-circulated during operation of the continuous flow device of the invention from the storage container to the fluid inlet 30 through the tub 1 to the fluid outlet 40 (alternatively, the fluid may enter at 40 and exit at 30). The continuous flow device may have means to control the temperature of the fluid, including but not limited to a heater, a cooling device, a counter-circulator, and the like. The means to control the temperature may be connected to the storage container, the tub, and or tubing containing the fluid. In an embodiment, the system comprises an access to add and or remove fluid. In an embodiment, the access is connected to the storage container. In an embodiment, the access is connected to the tub 1. The continuous flow/batch device may have means to circulate the fluid, such as a fluid pump 3. The means to circulate the fluid may be connected to the storage container, the tub, and or the tubing containing the fluid.

The tub 1 comprises a treatment zone 1000, with a belt 8 moving through the tub 1 and treatment zone 1000, and at least two sets of electrodes 2a-n-2b-n connected to an external power source 3 (FIG. 1). The treatment zone 1000 is made from an electrically insulating material and has a length that is determined by the time of exposure to peeling rates required for a given produce is peeled using the process of the invention, as well as the practical operating range of conveyor belt speeds available. The treatment zone 1000 may be of any geometrical shape that allows passage of the produce within an interior of the treatment zone. In an embodiment, the treatment zone 1000 is a hollow elongated tube shape. In an embodiment, the treatment zone 1000 is a hollow elongated cube or rectangular shape. The tub 1 serves the functions of housing of the treatment zone, fluid containment and recirculation, and preventing excess fluid from spilling out of the device.

The treatment zone 1000 comprises a belt 8, and at least two set of electrodes 2a-n, 2b-n connected to an external power source 3. The electrodes 2a-n, 2b-n are electrically connected to the power source. In an embodiment, the treatment zone 1000 comprises at least four sets of electrodes 2a-n, 2b-n made from electrically conducting materials; however, more or less sets of electrodes may be used in the continuous flow/batch device based on the type, amount of produce to be peeled and required throughputs. In an embodiment, four sets of electrodes are arranged at intervals along the interior of the treatment zone 1000. Intervals are determined by the produce to be peeled, the desired electric field strength, and the applied voltage, being designed to achieve the optimal field strength for peeling under the method of the invention. Electrode spacing is proportional to operational scale and throughput required.

The belt 8 is shaped to fit within the interior of the tub 1 and the treatment zone 1000. The belt 8 moves through the tub 1 and the treatment zone 1000. The belt 8 is made from an electrically insulating material. In an embodiment, the belt 8 extends to the exterior of the tub 1 so that produce may be loaded onto the belt 8 at a first end of the belt 8a and treated produce may be removed from the belt at a second end 8b. In an embodiment, the belt 8 is a continuous loop that transports the produce from a first end of the tub, introducing the produce to the fluid in the tub, enters the treatment zone, conveys the produce through the length of the treatment zone, exits the treatment zone and tub, and deposits the peeled produce at a collection point at or connected to a second end of the tub.

The present invention provides for processing of produce by batch or via a continuous process. When processed in batch, an amount of produce is added to the fluid in the treatment zone, the electrodes are energized for a given amount of time, and the produce is removed. When the process is continuous, the produce is continually added to the belt and each produce moves through the fluid in the treatment zone for a given amount of time.

The belt 8 comprises at least one divider 130. The dividers 130 are comprised of an electrically insulating material. The dividers 130 are physically attached and spaced along the belt 8 to maximize the uniformity of current density in the fluid medium during operation. The dividers 130 force the electrical current to move through a tortuous path so as to interact with the produce. In an embodiment, the dividers 130 are teeth placed at intervals along the belt and generally perpendicular to a top surface of the belt 8. In an embodiment, the dividers 130 are removable and replaceable. The belt may also comprise other components and or attachments which may move the produce or increase the length of the path of the electrical current between an electrode set or among electrodes.

The conveyor belt 8 is driven by at least one wheel 140 or 150. The wheel may be turned by a powered motor (not shown). In the preferred embodiment, the wheel 140 or 150 is a sprocket. In an embodiment, a set of sheaves 160 helps direct and control the path of the belt in a continuous loop. There are many possible belt forms that may be used. Belt forms may include molded solid flat belting with or without molded in or bolted on cleats, with or without sidewalls; modular segmented belting, with or without cleats, with or without sidewalls; mesh conveyor (plastic or rubber); O-ring round belting (ganged together to form a belt of desired width); v-belts (ganged together for form a belt of desired width); or belts formed of plastic links.

Modular plastic belts may be configured in a variety of widths and fitted with special attachments for specific conveying needs. Materials of construction can include polypropylene, compounded polypropylene, nylon, acetal-Teflon, and the like, and all materials previously mentioned may be reinforced with glass or thermoplastic fiber strand, chopped fiber, mat, or webs from families of glass and polymers and blends of polymers.

Furthermore, non-belt type conveying methods may be used to move produce through the treatment zone, including but not limited to, roller conveyors, either powered or gravity driven; screw conveyors; overhead chain conveyors; bucket conveyors; hydraulic or gravity.

The treatment zone 1000 comprises an upper barrier 90. The upper barrier 90 is made from an electrically insulating material. The upper barrier 90 keeps produce from moving above the liquid level during processing to ensure that all parts of the produce are exposed to fluid and current.

In an embodiment, the tub 1 contains a circulating peeling fluid medium 4. The fluid medium 4 comprises an aqueous solution of one or more electrolytes. For such electrolytes cations can be any mono or divalent species including one or more of the following: potassium, sodium, magnesium or calcium; electrolyte anions can be appropriate counter ions including one or more of the following: chloride, hydroxide, sulfates, phosphates or nitrates. The electrolytes in solution provide at least conductivity in the peeling medium and in the case of hydroxides, chemical disruption of the peel. The combination of electric current and chemical action accelerates the rate of peel removal. The specific electrolyte and the concentration of electrolyte is selected based on the produce to be processed. For example, in peeling a tomato and produce of similar pH and peel structure, the electrolyte may comprise an about 0.01% sodium chloride and an about 0.5 to an about 1% potassium hydroxide; or an about 0.01% sodium chloride and an about 0.5% sodium hydroxide. In an example for pears and produce of similar pH and peel structure, the electrolyte may comprise approximately 2% to about 3% sodium hydroxide. Generally, the selection of the fluid medium depends upon its demonstrated efficacy in peeling of the specific produce in question. In an embodiment, the fluid comprises an approximately 2% sodium hydroxide at an electric field strength of approximately 532 Volts/meter. In an embodiment, the fluid comprises an approximately 3% sodium hydroxide at an electric field strength from about 426 to about 479 Volts/meter.

The belt is in communication with a separator 9. The separator 9 separates the fluid from the peeled produce and the peel from the peeled produce.

Continuous Flow/Batch Method

The method of the continuous flow or batch processing using the device will now be described. In an embodiment, a produce 6, 6n enters the tub 1, and thereafter into the treatment zone 1000, where it is exposed to the fluid 4 and to a current produced at the electrodes 2a-n, 2b-n. As the produce is immersed in the fluid, the outer peel act as a non-permeable, partial or semi-permeable barrier between the flesh of the produce and the chemicals of the fluid. In an embodiment using NaOH, the NaOH begins to disrupt the peel at entrance points when available, such as but not limited to, blemishes and the stem and blossom scar and other points of entry. As the electrical current flows, the fluid is heated and some of that heat is transferred to the produce 6, 6n. The electrodes 2a-n, 2b-n are energized to different potential levels to allow the passage of electrical current through the fluid and the produce 6, 6n to effect peeling.

The height of the electrodes in the treatment zone may range from a fraction of the fluid height to equal to or greater than the level of the fluid surface, which is restricted in the treatment zone to the level of the upper barrier 90. This ensures that current flows uniformly throughout the fluid in the treatment zone, ensuring that all parts of produce are treated. Uniformity of current distribution within the fluid in the treatment zone 1000 is also promoted by the presence of the electrically insulating dividers 130.

An increase in internal temperature near and under the surface of the peel of a produce causes a buildup of pressure under the peel of certain produce, causing the peel to mechanically separate from the flesh. In other produce, the combination of at least one of an electrical, chemical, mechanical and or thermal effect results in sloughing of the peel from the surface of the produce.

The produce 6, 6n is introduced to the system on the belt 8. In an embodiment, the belt comprises at least one divider 130 to maximize the uniformity of current density in the fluid medium during operation. The at least one divider 130 force the electrical current to move through a tortuous path so as to interact with the produce.

Figure 9:
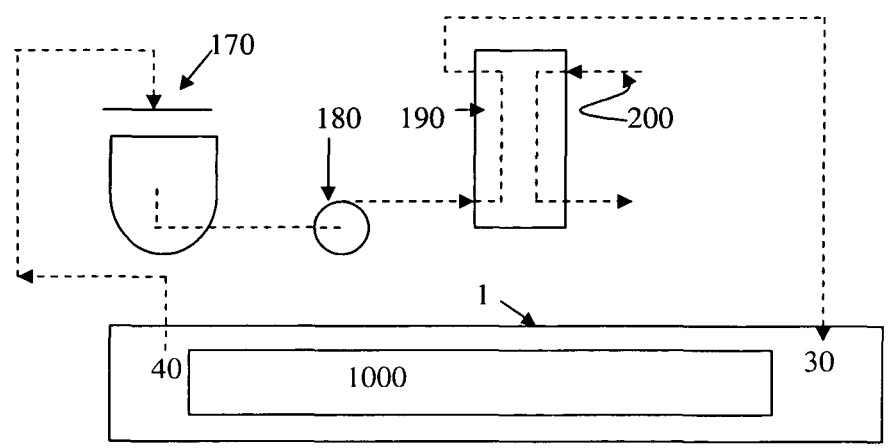
FIG. 9 is a schematic of an embodiment of a continuous flow/batch device of the present invention showing fluid flow.

FIG. 9 depicts an example of fluid circulation in a continuous flow/batch device. As shown by the arrows and dashed lines, (which direction can be reversed) the fluid is circulated through piping or tubing by a pump 180 from the storage container 170 through a heat exchanger 190 where it exchanges heat with a temperature control medium 200. The fluid is transported to an inlet 30 of the tub 1 and through the treatment zone. Upon passage through the tub 1 and treatment zone, the fluid exits at the outlet 40 and flows to the storage container 170. Alternately, the direction of the fluid flow may be reversed.

Figure 10:
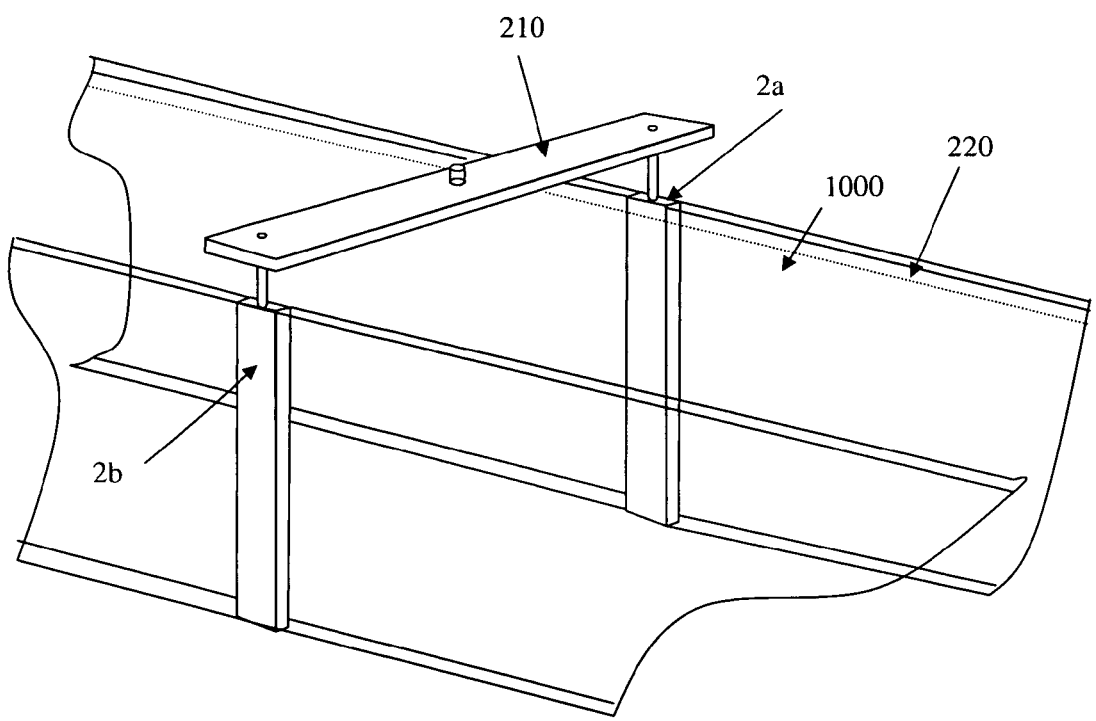
FIG. 10 is a cut away view of an embodiment of a continuous flow/batch device of the present invention.

Referring to the embodiment depicted in FIG. 10, a detail of an embodiment of an electrode set 2a-n, 2b-n comprises two immersed components at the same potential located at a side wall of the treatment zone 1000 and connected through a bus 210 connected electrically to the power source 3. In an embodiment, the height of the electrodes 2a-n, 2b-n extends from a bottom of the treatment zone 1000 to a length at least at or above the liquid level, although any height may be used that provides a suitable treatment zone. The fluid level in the tub (as shown by dotted line 221 in FIG. 8) may or may not be the same as the level in the treatment zone (shown by dotted line 220 in FIG. 8). Each electrode 2a-n, 2b-n in a set are placed apart from each other at a sufficient distance to permit passage of electrical current between the electrodes through the fluid and produce. Multiple electrode sets (FIG. 8) are located at a distance along the treatment zone. The number of electrode sets and the distance between sets varies based upon parameters, including at least one of the length of the treatment zone, the applied voltage, field strength, the type of produce to be peeled, the depth of the fluid, the fluid, the temperature, the speed of the movement of the belt, and the like.

The electrodes pass current into the fluid and produce, which then passes out through sets of electrodes at different potentials. To clarify further, each electrode of a first electrode set 2a-n, 2b-n are each at ground (zero) potential. Each electrode of a second electrode set 2a-n, 2b-n are at a different potential. Thus, current flows through the produce at each portion of the treatment zone. When produce is between a given electrode set, it is exposed to the electrical currents between that set of electrodes. When produce is between a first electrode set 2a-n, 2b-n it is exposed to the electrical currents between that electrode set. When produce is between a second electrode set, it is exposed to the current between such second set. When produce is between an nth electrode set, it is exposed to the current between such nth set. The foregoing descriptions of specific embodiments and examples of the present invention have been presented for purposes of illustration and description. They are not intended to be exhaustive or to limit the invention to the precise forms disclosed, and obviously many modifications and variations are possible in light of the above teachings. It will be understood that the invention is intended to cover alternatives, modifications and equivalents. The embodiments were chosen and described in order to best explain the principles of the invention and its practical application, to thereby enable others skilled in the art to best utilize the invention and various embodiments with various modifications as are suited to the particular use contemplated. It is therefore to be understood that within the scope of the appended claims, the invention may be practiced otherwise than as specifically described herein.

What is claimed is:

1. A method for removing a peel from a produce having a blossom end and a stem end, the method comprising the steps of:
   in a container, flowing an electrically conductive fluid into an inlet of the container to an outlet thereof;
   inserting into the container at least one unpeeled produce via a belt, the belt comprising an electrically non-conductive material and having electrically non-conductive dividers;
   subjecting the electrically-conductive fluid and the produce to an electric current in the container, said current flowing in a tortuous path around the non-conductive dividers-for a time and current strength sufficient to create a first boiling front at the blossom end between an inside of the peel and an outer flesh of the produce and a second boiling front at the stern end between the inside of the peel and the outer flesh of the produce and to advance the boiling fronts towards each other until the boiling fronts cause a pressure that removes the peel from the produce, resulting in a whole peeled produce and a separated peel; and
   removing the whole peeled produce from the container via the non-electrically conductive belt.

2. The method of claim 1 where the produce is a tomato.

3. The method of claim 1 where the electrically-conductive fluid comprises an approximately 0.01% sodium chloride, 1.0% sodium hydroxide at an electric field strength of approximately 1210 Volts/meter.

4. The method of claim 2 where the electrically-conductive fluid comprises an approximately 3% sodium hydroxide at an electric field strength from about 426 to about 479 Volts/meter.

5. The method of claim 2 wherein a temperature of the fluid is from about 20° C. to about 75° C. prior to application of the current.

6. The method of claim 2, wherein:
   the current has a voltage approximately proportional to a distance between adjacent sets of electrodes.

7. The method of claim 1 where the produce is a pear.

8. The method of claim 7 where the electrically-conductive fluid comprises an approximately 2% sodium hydroxide at an electric field strength of approximately 532 Volts/meter.

9. The method of claim 7 where the electrically-conductive fluid comprises an approximately 3% sodium hydroxide at an electric field strength from about 426 to about 479 Volts/meter.

10. The method of claim 7 wherein a temperature of the fluid is from about 20° C. to about 75° C. prior to application to the current.

11. The method of claim 7, wherein:
    the current has a voltage approximately proportional to a distance between adjacent sets of electrodes.

12. The method of claim 1 where the electrically-conductive fluid comprises an approximately 3% sodium hydroxide at an electric field strength from about 426 to about 479 Volts/meter.

13. The method of claim 1 wherein a temperature of the fluid is from about 20° C. to about 75° C. prior to application of the current.

14. The method of claim 1 wherein:
    the steps of subjecting the produce to the electrical current is achieved through multiple sets of electrodes.

15. The method of claim 14 the wherein:
    the current has a voltage approximately proportional to a distance between adjacent sets of electrodes.

16. A method for removing a peel from a tomato, the method comprising the steps of:
    in a container, flowing an electrically conductive fluid into an inlet of the container to an outlet thereof
    inserting into the container at least one unpeeled tomato via a belt, the belt comprising an electrically non-conductive material and having electrically non-conductive dividers;
    subjecting the electrically-conductive fluid and the produce to an electric current in the container, the current flowing in a tortuous path around the non-conductive dividers for a time and current strength sufficient to create a first boiling front at a blossom end of the unpeeled tomato between an inside of the peel and an outer flesh of the tomato and a second boiling front at a stem end of the tomato between the inside of the peel and the outer flesh of the unpeeled tomato and advancing the boiling fronts towards each other until the boiling fronts cause a pressure that removes the peel from the tomato, resulting in a whole peeled tomato; and
    removing the whole peeled tomato from the container via the non-electrically conductive belt.

17. The method of claim 16, wherein:
    the current has a voltage approximately proportional to a distance between adjacent sets of electrodes.

* * * * *